United States Patent
Shelton et al.

(10) Patent No.: US 10,696,289 B2
(45) Date of Patent: Jun. 30, 2020

(54) SYSTEMS AND METHODS FOR MEETING WHEEL TORQUE DEMAND IN A HYBRID VEHICLE

(71) Applicant: Ford Global Technologies, LLC, Dearborn, MI (US)

(72) Inventors: Matthew John Shelton, Grosse Ile, MI (US); Jeffrey Doering, Canton, MI (US); Kevin Ray Ruybal, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 166 days.

(21) Appl. No.: 15/890,132

(22) Filed: Feb. 6, 2018

(65) Prior Publication Data

US 2018/0229712 A1 Aug. 16, 2018

Related U.S. Application Data

(60) Provisional application No. 62/459,007, filed on Feb. 14, 2017.

(51) Int. Cl.
*B60W 10/02* (2006.01)
*B60W 10/08* (2006.01)
(Continued)

(52) U.S. Cl.
CPC ............ *B60W 20/10* (2013.01); *B60W 10/02* (2013.01); *B60W 10/06* (2013.01); *B60W 10/08* (2013.01); *B60W 10/113* (2013.01); *B60W 2520/30* (2013.01); *B60W 2540/10* (2013.01); *B60W 2710/023* (2013.01); *B60W 2710/0666* (2013.01); *B60W 2710/083* (2013.01); *B60W 2720/106* (2013.01); *Y02T 10/6286* (2013.01); *Y10S 903/93* (2013.01); *Y10S 903/946* (2013.01)

(58) Field of Classification Search
CPC .... B60W 10/02; B60W 10/08; B60W 10/113; B60W 2520/30; B60W 2540/103; F16H 61/688; F16H 2061/124; F16H 2063/508
See application file for complete search history.

(56) References Cited

U.S. PATENT DOCUMENTS

| 6,116,363 | A   | 9/2000 | Frank |
|-----------|-----|--------|-------|
| 7,713,164 | B2* | 5/2010 | Silveri ................. B60W 20/30 477/5 |

(Continued)

*Primary Examiner* — Tisha D Lewis
(74) *Attorney, Agent, or Firm* — David Kelley; McCoy Russell LLP

(57) ABSTRACT

Systems and methods are shown for meeting wheel torque demand in a hybrid vehicle with an engine, a dual clutch transmission coupled to a driveline of the vehicle downstream of the engine, and an electric machine coupled to the driveline downstream of the dual clutch transmission. In one example, a method includes transferring transmission input torque through a clutch of the dual clutch transmission controlled to a first capacity, and, in response to a desired transmission input torque exceeding the capacity, increasing torque output of the electric machine coupled downstream of the dual clutch transmission to assist in meeting a wheel torque demand. In this way, a driver-requested increase in acceleration may be met under conditions where transmission input torque is limited by clutch capacity.

20 Claims, 7 Drawing Sheets

(51) Int. Cl.
*B60W 10/113* (2012.01)
*F16H 61/688* (2006.01)
*F16H 61/12* (2010.01)
*F16H 63/50* (2006.01)
*B60W 20/10* (2016.01)
*B60W 10/06* (2006.01)

(56) References Cited

U.S. PATENT DOCUMENTS

| | | |
|---|---|---|
| 7,828,694 B2 | 11/2010 | Silveri et al. |
| 8,079,936 B2 | 12/2011 | MacFarlane et al. |
| 8,224,513 B2 | 7/2012 | Soliman et al. |
| 8,469,858 B2 | 6/2013 | Yang et al. |
| 8,647,231 B2 | 2/2014 | Soliman et al. |
| 9,476,461 B2 | 10/2016 | Genise |
| 9,809,226 B2 * | 11/2017 | Goeppert ................ F16H 61/12 |
| 2005/0064987 A1 * | 3/2005 | Budal .................... B60K 28/16 |
| | | 477/3 |
| 2005/0164829 A1 * | 7/2005 | Reitz ....................... B60K 6/36 |
| | | 477/6 |
| 2009/0118936 A1 | 5/2009 | Heap et al. |
| 2009/0137363 A1 * | 5/2009 | Leibbrandt ............ F16D 48/08 |
| | | 477/109 |

* cited by examiner

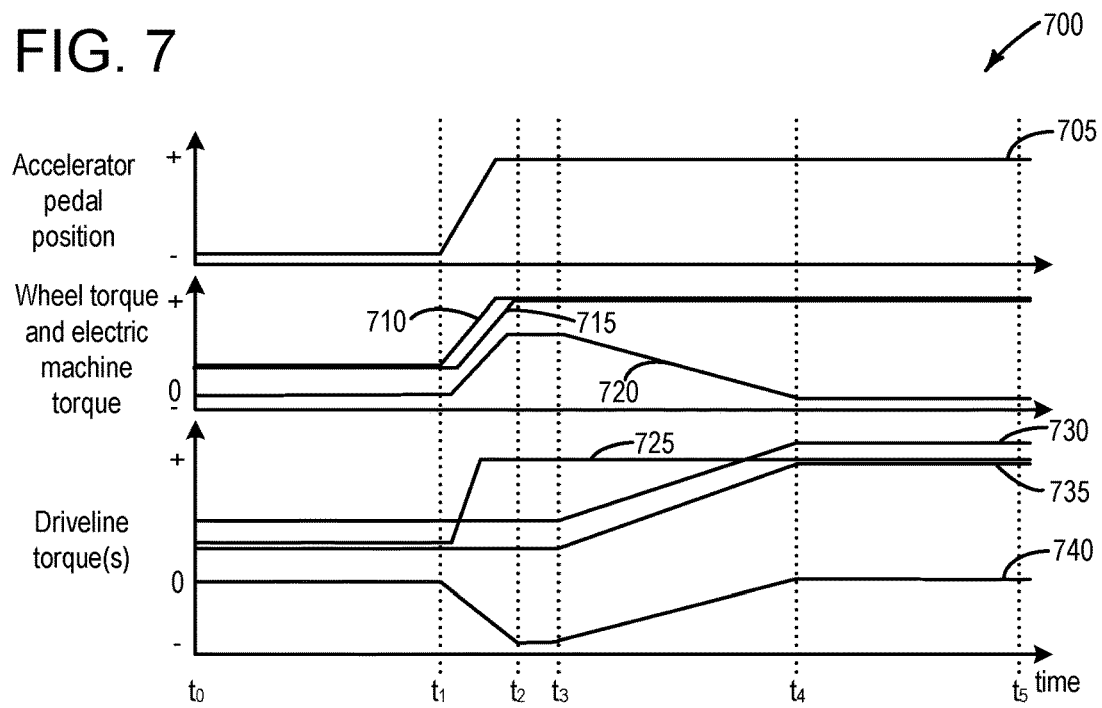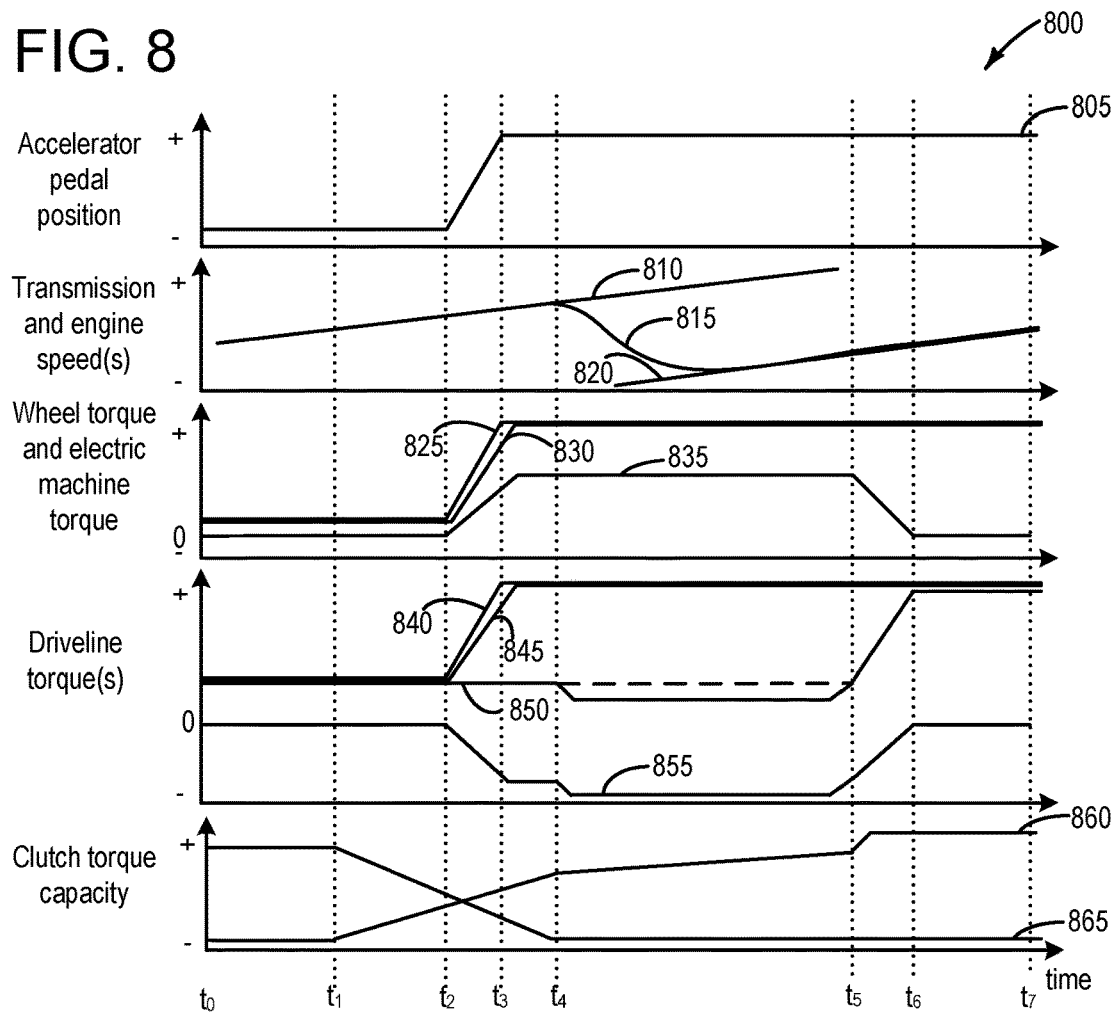

SYSTEMS AND METHODS FOR MEETING WHEEL TORQUE DEMAND IN A HYBRID VEHICLE

CROSS REFERENCE TO RELATED APPLICATION

The present application claims priority to U.S. Provisional Patent Application No. 62/459,007 entitled "Systems and Methods for Meeting Wheel Torque Demand in a Hybrid Vehicle," filed on Feb. 14, 2017. The entire contents of the above-referenced application are hereby incorporated by reference in their entirety for all purposes.

FIELD

The present description relates generally to methods and systems for meeting driver demanded wheel torque under conditions where an input torque to a transmission is limited.

BACKGROUND/SUMMARY

Under conditions where a vehicle operator indicates a desire for increased vehicle acceleration by pressing on an accelerator pedal, transmission assembly input torque may have to be increased to achieve the desired increase in vehicle acceleration. However, if the desired transmission assembly input torque requested exceeds a current transmission assembly input torque limit, then any excess transmission assembly input torque may only accelerate the transmission assembly input speed, result in a large clutch slip for a vehicle transmission with one or more transmission clutches, and may not result in an increase in the vehicle speed. In such a case, in addition to not achieving the driver's demand for an increase in vehicle acceleration, the resulting clutch slip may result in durability issues.

One example where a vehicle transmission may have a torque limit includes a dual clutch transmission (DCT) in a clutch torque tracking mode. More specifically, a torque tracking mode may include conditions where a clutch torque capacity of an active clutch of the DCT is set to be above the transmission assembly input torque by a threshold amount. In other words, the active clutch may not be locked at a maximum torque capacity possible, but may be maintained below the transmission assembly input torque threshold. Benefits of torque tracking may include faster clutch opening responsive time, and less hydraulic pressure demand from a pump configured to provide hydraulic fluid to the DCT clutches. However, in such a torque tracking mode, any desired increase in transmission assembly input torque must be coordinated with an increase in clutch toque capacity. Typically, some sort of rate limit may be imposed on the increase in transmission assembly input torque to avoid transmission assembly input torque increasing beyond clutch torque capacity.

Another example may comprise a shift event for a dual clutch transmission. Typically, during an upshift event, a clutch torque capacity may be lowered on an off-going clutch, while clutch torque capacity may be simultaneously increased on an on-coming clutch. The shift may finish, or conclude, when transmission input speed decreases to a speed determined by the new gear ratio, with the on-coming clutch carrying all of the transmission input torque.

If, during such an upshift event, a vehicle operator suddenly steps into the accelerator pedal, an increase in transmission input torque may be needed to accomplish the vehicle operator's request for more acceleration. However, the problem is that clutch torque capacity for such a shift may be scheduled based on the transmission assembly input torque requested at the start of the shift. If the transmission input torque rises too quickly during a shift, the clutch may not be able to increase torque capacity as quickly, and once the transmission input torque exceeds the clutch torque capacity, the transmission assembly input speed may start to accelerate and the shift may not finish because the upshift necessitates a decrease in the transmission assembly input speed.

A vehicle may solve this problem by limiting the increase in the transmission assembly input torque as a function of clutch torque capacity, where the transmission assembly input torque is limited below driver requested torque and increased slowly in coordination with the increasing clutch torque capacity. This may result in a slower response to the driver's request for more vehicle acceleration, which may be perceived by the vehicle operator as hesitation. Furthermore, the engine may need additional time t0 build torque responsive to the clutch torque limit being removed because of the response time of certain actuators (e.g. turbo delay, etc.).

Another example may include a situation where a clutch torque capacity may be incorrectly estimated to be large enough for an increase in transmission assembly input torque, but where in fact the clutch does not have as much torque capacity as expected. Such a discrepancy may be the result of clutch degradation, incorrect sensor readings, or an error in a clutch torque estimation algorithm. In such an example, when transmission assembly input torque is increased above clutch torque capacity, the transmission assembly input speed may increase above the transmission input shaft speed, which may result in clutch slip.

The inventors herein have recognized these issues, and have developed systems and methods to at least partially address the above issues. In one example, a method is provided, comprising transferring transmission input torque through a clutch of a dual clutch transmission controlled to a first capacity less than a maximum capacity, and in response to a desired transmission input torque exceeding the capacity, increasing torque output of a motor coupled downstream of the dual clutch transmission to assist in meeting a wheel torque demand, while maintaining transmission input torque below the first capacity. In an example, the motor coupled downstream of the dual clutch transmission includes an electric machine configured to provide torque to driven wheels, where driven wheels include one or more wheels receiving power from the engine, or one or more electric motors coupled to non-driven wheels. In this way, requested wheel torque may be met and without resultant clutch slippage.

In one example, the method may comprise increasing the clutch capacity from the first capacity to a second capacity greater than the desired transmission input torque while the torque output of the motor is assisting in meeting wheel torque demand. In such an example, the method may further comprise increasing transmission input torque while increasing the clutch capacity to the second capacity, while maintaining the transmission input torque below the increasing clutch capacity. Such a method may further include reducing output of the motor while increasing transmission input torque, to meet the wheel torque demand. Still further, the method may comprise increasing engine torque to the desired input torque while offsetting the increased engine torque via negative torque provided via an integrated starter/generator coupled to the engine, where increasing the transmission input torque while increasing the clutch capacity is accomplished via reducing the negative torque provided via the integrated starter/generator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows an example timeline illustrating a vehicle operator-requested increase in vehicle acceleration in a hybrid vehicle where a dual clutch transmission is operated in a torque tracking mode.

FIG. 8 shows an example timeline illustrating a vehicle operator-requested increase in vehicle acceleration in a hybrid vehicle during a shift event.

DETAILED DESCRIPTION

Figure 4:
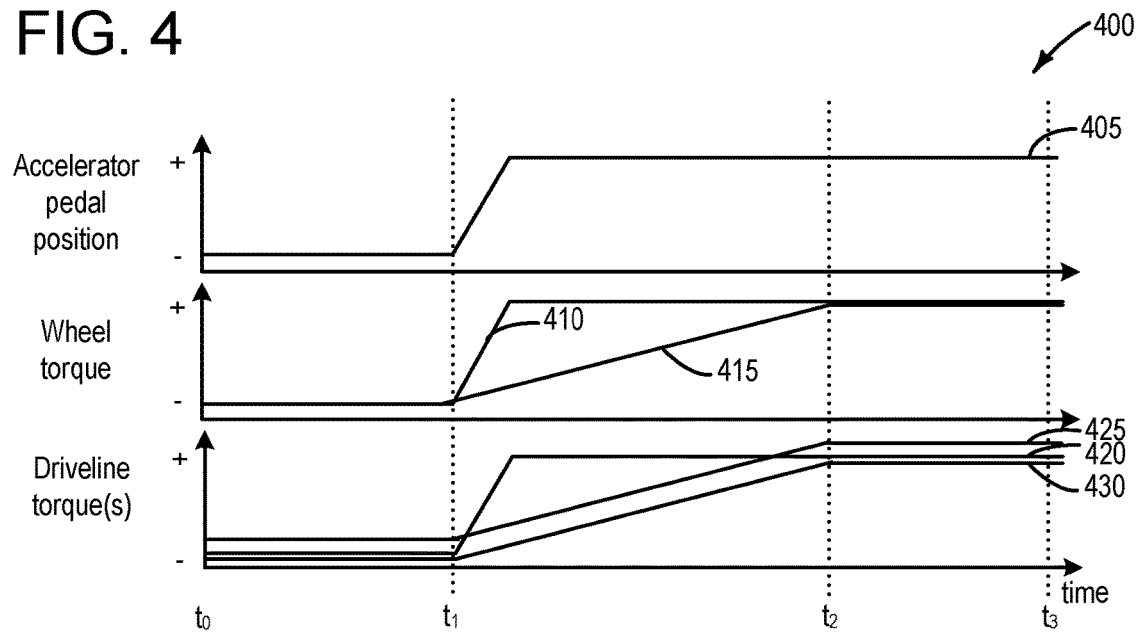
FIG. 4 shows an example timeline illustrating a vehicle operator-requested increase in vehicle acceleration in a non-hybrid vehicle where a dual clutch transmission is operated in a torque tracking mode.
Figure 5:
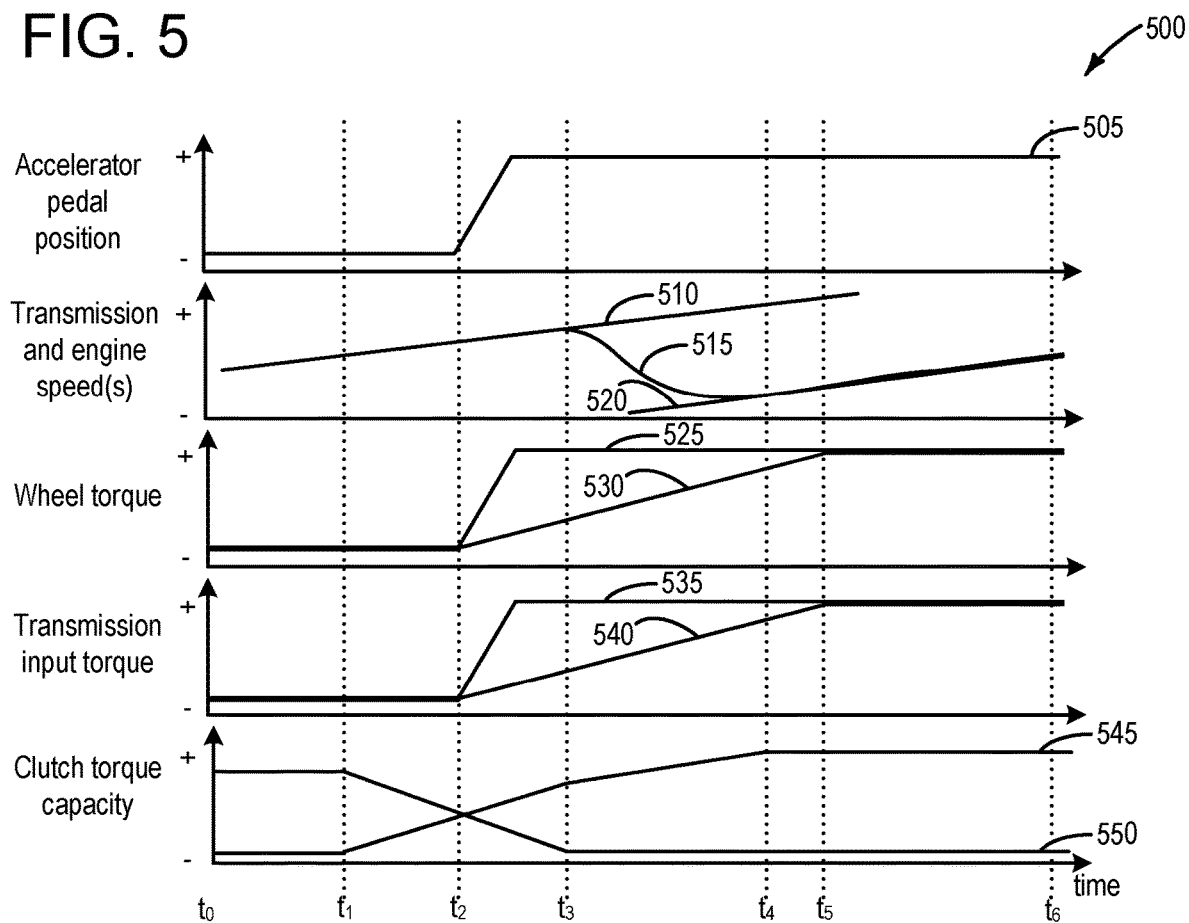
FIG. 5 shows an example timeline illustrating a vehicle operator-requested increase in vehicle acceleration in a non-hybrid vehicle during a shift event.

The following description relates to systems and methods for meeting a driver-demanded wheel torque request, under conditions where a transmission assembly input torque is limited. FIGS. 1A-3 show an example hybrid vehicle system that includes a driveline with an engine, an integrated starter/generator, a dual clutch transmission, and an electric machine that is positioned downstream of the dual clutch transmission. An example timeline illustrating a vehicle operator-requested increase in vehicle acceleration in a non-hybrid vehicle where a dual clutch transmission is being operated in a torque tracking mode, is depicted at FIG. 4. The example timeline depicted at FIG. 4 illustrates a delay between a request for a wheel torque increase, and an actual wheel torque increase. An example timeline illustrating a vehicle operator-requested increase in vehicle acceleration in a non-hybrid vehicle, during an upshift event, is depicted at FIG. 5. The example timeline depicted at FIG. 5 illustrates a delay between a request for a wheel torque increase, and an actual wheel torque increase, during the upshift event.

Figure 6:
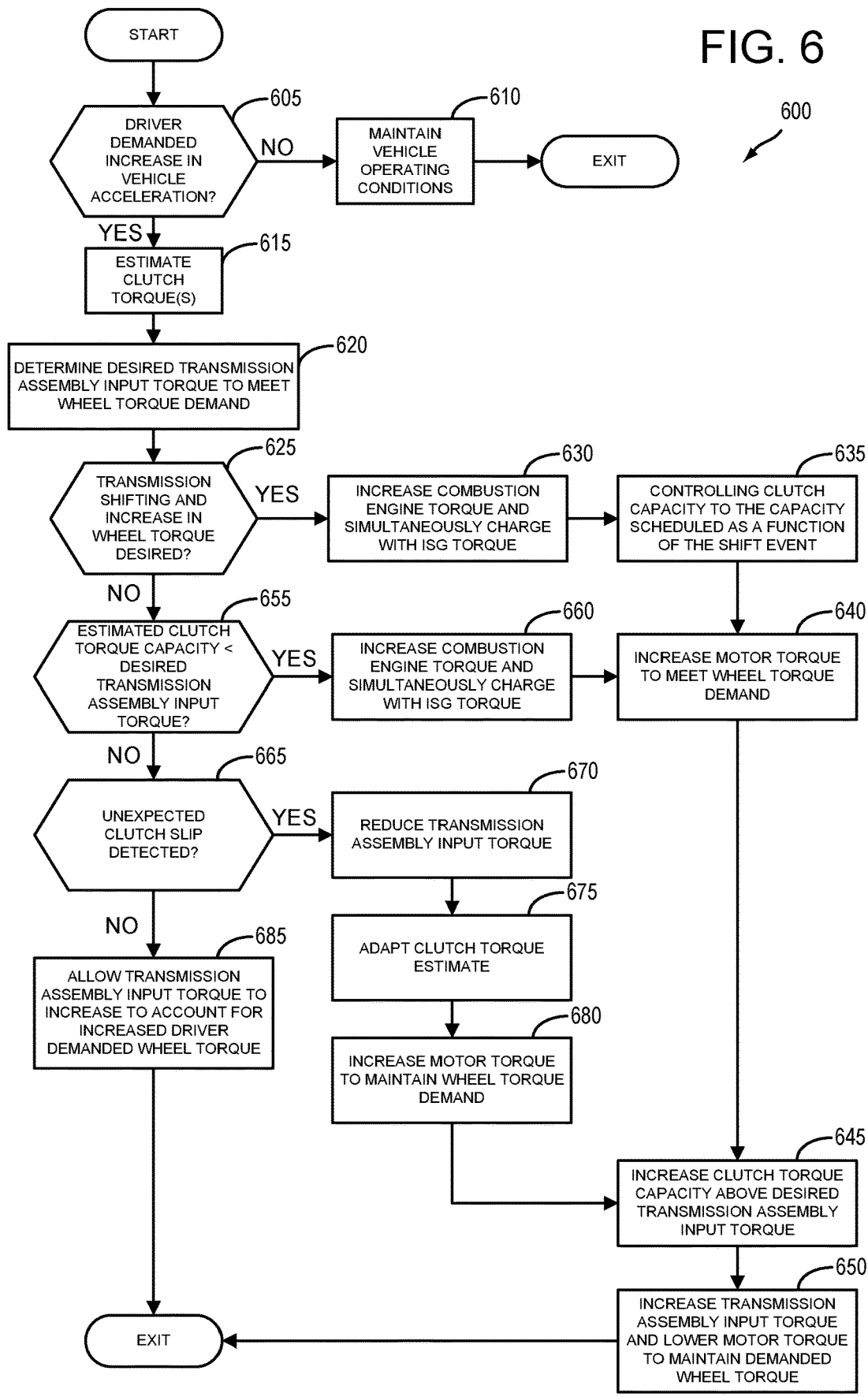
FIG. 6 shows a high level example method for meeting a request for vehicle acceleration in a hybrid vehicle under conditions where the transmission is in a torque tracking mode, under conditions where the increase in acceleration is requested during a shift event, or under conditions where increased acceleration results in unexpected clutch slip.

To address the issues illustrated in FIGS. 4-5, a method for meeting a request for vehicle acceleration in a hybrid vehicle, is illustrated in FIG. 6. More specifically, FIG. 6 illustrates a method for meeting a driver-requested wheel torque demand under conditions where the transmission is in a torque tracking mode and an upshift is not in progress, under conditions where the increase in wheel torque demand is requested during an upshift event, or under conditions where increased wheel torque demand results in unexpected clutch slippage. An example timeline for meeting a driver-requested wheel torque demand under conditions where the transmission is in a torque tracking mode and an upshift is not in progress, is illustrated at FIG. 7. An example timeline for meeting a driver-requested wheel torque demand under conditions where increased wheel torque demand is requested during an upshift event, is illustrated at FIG. 8. In the method depicted at FIG. 6, along with the example timelines depicted at FIG. 7 and FIG. 8, it may be understood that the hybrid vehicle includes an engine, with a dual clutch transmission coupled in a driveline of the vehicle downstream of the engine, and further comprises an electric machine downstream of the dual clutch transmission.

Figure 1A:
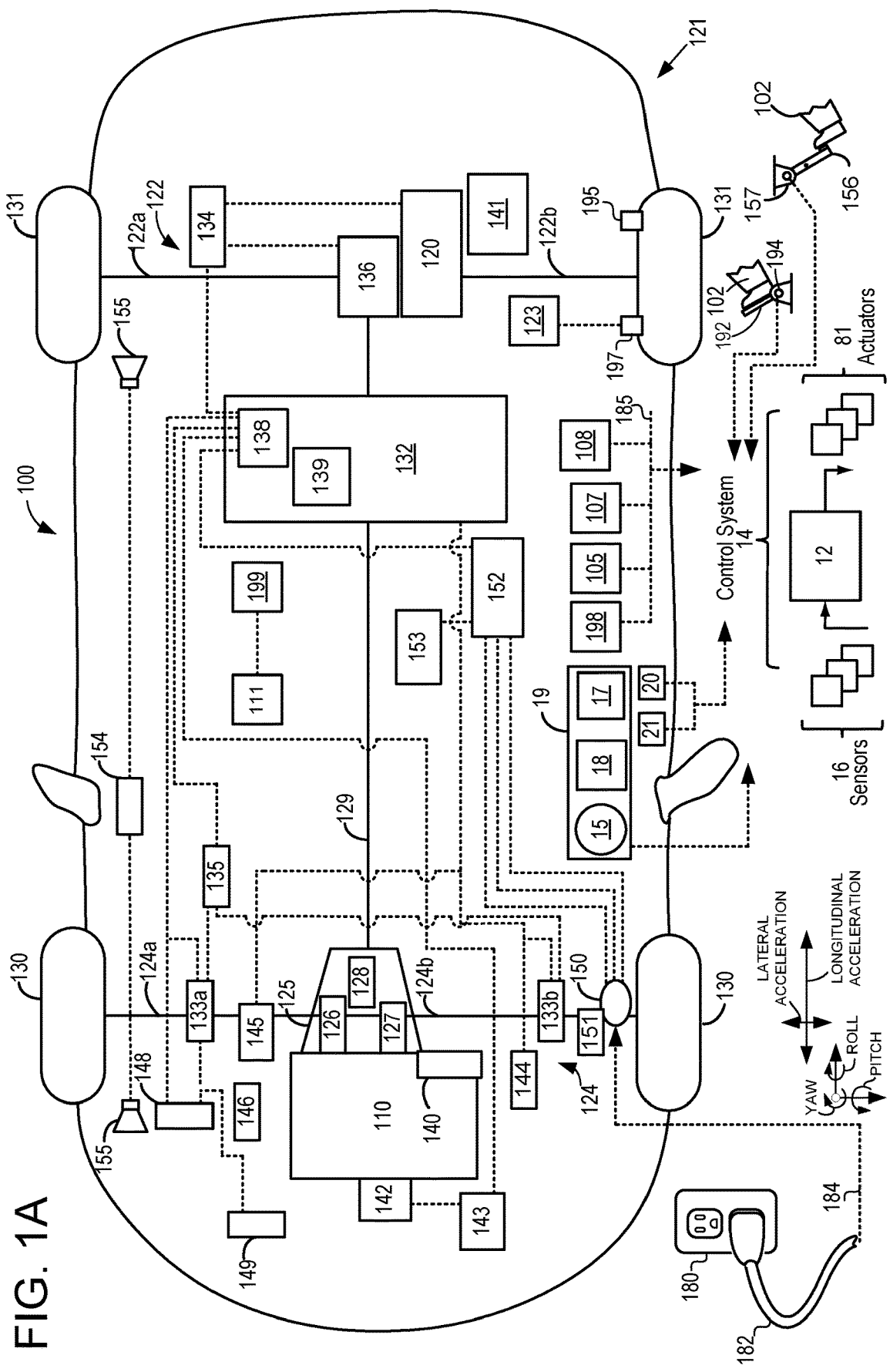
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle 124 and a rear axle 122. In some examples, rear axle may comprise two half shafts, for example first half shaft 122a, and second half shaft 122b. Furthermore, in some examples, front axle 124 may comprise two half shafts, for example third half shaft 124a and fourth half shaft 124b. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Alternatively, front axle 124 may be driven electrically via one or more of first electric motor(s) 133a and second electric motor 133b.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120, integrated starter/generator 142, first electric motor 133a, and/or second electric motor 133b. A first inverter system controller (ISC1) 134 may convert alternating current generated by electric machine 120 to direct current for storage at the energy storage device 132 and vice versa.

Similarly, first electric motor 133a and second electric motor 133b may receive electrical power from onboard energy storage device 132. Furthermore, first electric motor 133a and second electric motor 133b may provide a generator function to convert the vehicle's kinetic energy into electrical energy, where the electrical energy may be stored at energy storage device 132 for later use by the electric machine 120, integrated starter generator 142, first electric motor 133a, and/or second electric motor 133b. A third inverter system controller (ISC3) 135 may convert alternating current generated by electric motor(s) 133a and 133b to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, first electric motor 133a, second electric motor 133b, energy storage device 132, integrated starter/generator 142, transmission 125, etc. Control system 14 may receive sensory feedback information from one or more of engine 110, electric machine 120, first electric motor 133a, second electric motor 133b, energy storage device 132, integrated starter/generator 142, transmission 125, etc. Further, control system 14 may send control signals to one or more of engine 110, electric machine 120, first electric motor 133a, second electric motor 133b, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIGS. 1B-3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, first electric motor 133*a*, second electric motor 133*b*, and electric machine 120) based on an operator input. Various examples of the operator ignition interface 15 may include interfaces that necessitate a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
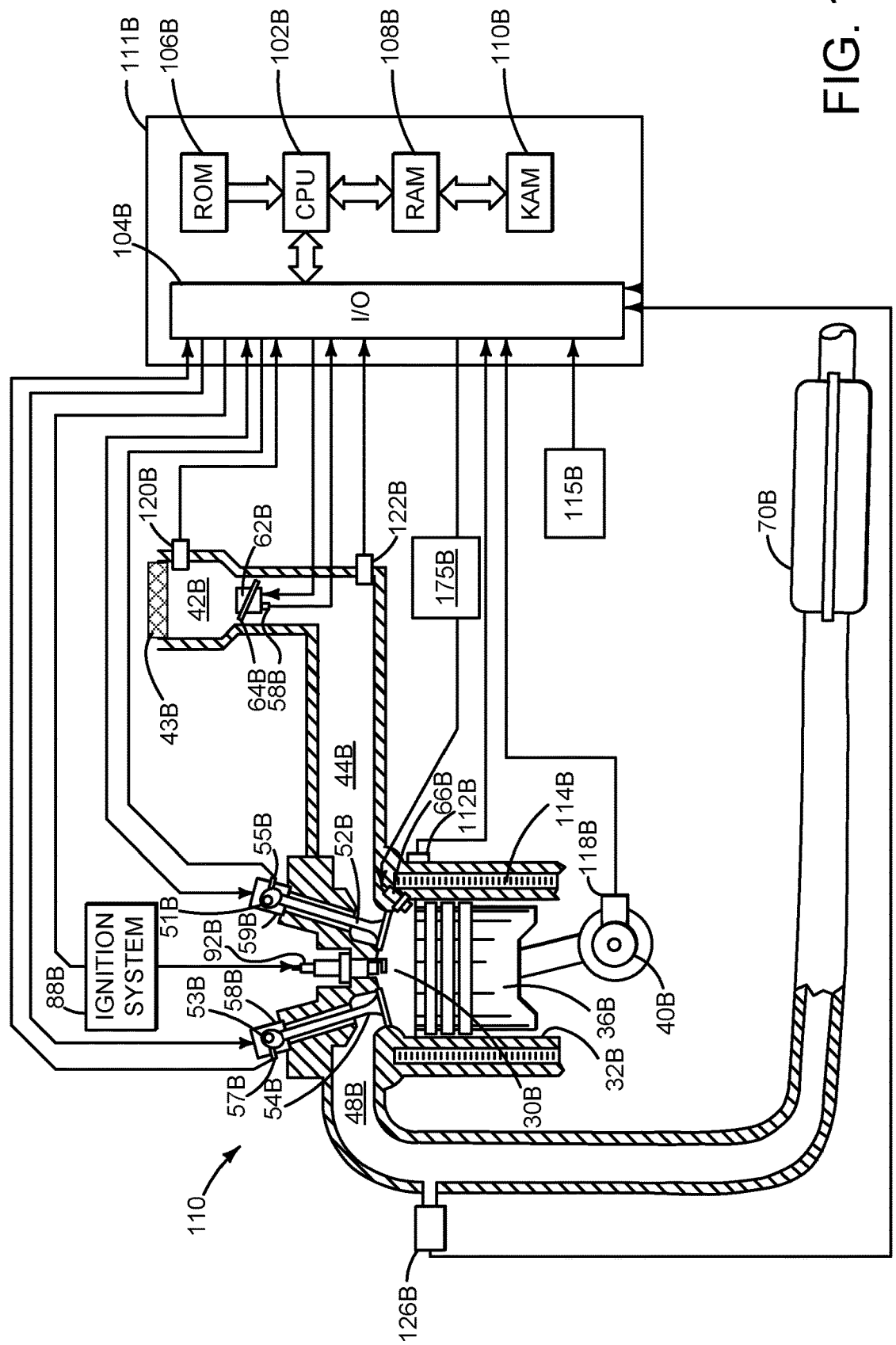
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
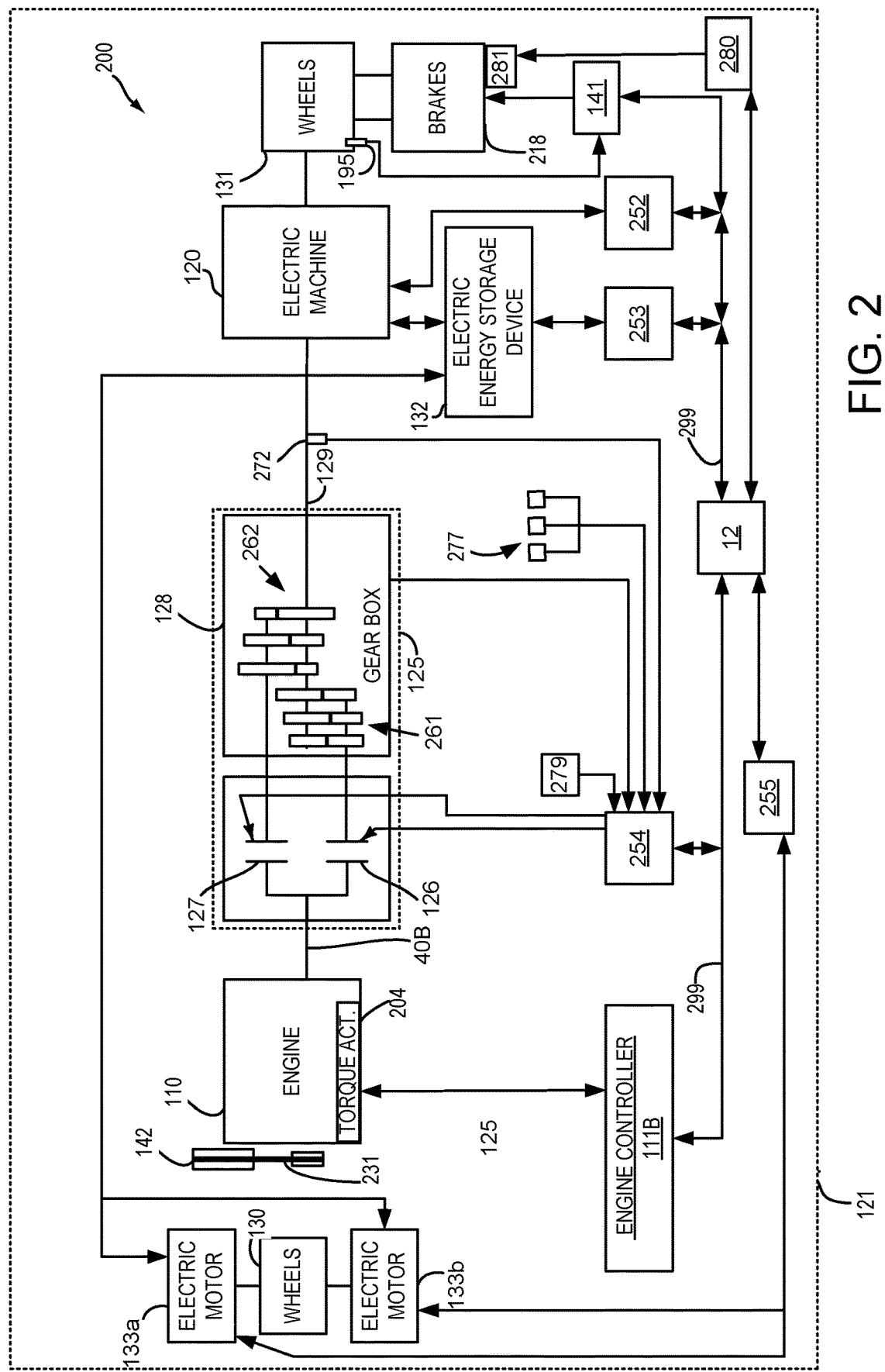
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, electric motor controller 255, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine/electric motors, information regarding degraded brakes). Further, the vehicle system controller 12 may provide commands to engine controller 111B, electric machine controller 252, transmission controller 254, electric motor controller 255, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, electric motor controller 255, and brake controller 141. Alternatively, the vehicle system controller 12 and the engine controller 111B may be a single unit while the electric machine controller 252, electric motor controller 255, the transmission controller 254, and the brake controller 141 may be standalone controllers.

In this example, powertrain 200 may be powered by engine 110 and electric machine 120. In other examples, engine 110 may be omitted. In some examples, wheels 130 may be driven via either or both of first electric motor 133a and/or second electric motor 133b. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Similarly, first electric motor 133a and second electric motor 133b are also referred to herein as electric machine(s), and/or generator(s). Further, torque of engine 110 may be adjusted via a torque actuator 204, such as a fuel injector, throttle, etc.

BISG 142 is mechanically coupled to engine 110 via belt 231. BISG 142 may be coupled to a crankshaft 40B or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Similarly, first electric motor 133a and second electric motor 133b may be operated to provide torque to wheels 130, or to convert kinetic energy into electrical energy to be stored in electrical energy storage device 132. First electric motor 133a and second electric motor 133b are in electrical communication with energy storage device 132.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252. Furthermore, first electric motor 133a and second electric motor 133b may provide positive or negative torque to wheels 130 via operating as a motor or generator as instructed by electric motor controller 255.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, first electric motor 133*a*, second electric motor 133*b*, and brakes 218 provided via engine controller 111B, electric machine controller 252, electric motor controller 255, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art. Similarly, electric motor controller 255 may control torque output and electrical energy production from first electric motor 133*a* and second electric motor 133*b* by adjusting current flowing to and from field and/or armature windings of first and second electric motor (e.g. 133*a* and 133*b*) as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, first input shaft speed sensor(s), second input shaft speed sensor(s), and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125. Additionally, as discussed above and which will be discussed in further detail below, in some examples additional torque may be provided to wheels 130 via one or more of first electric motor 133*a* and second electric motor 133*b*.

Figure 3:
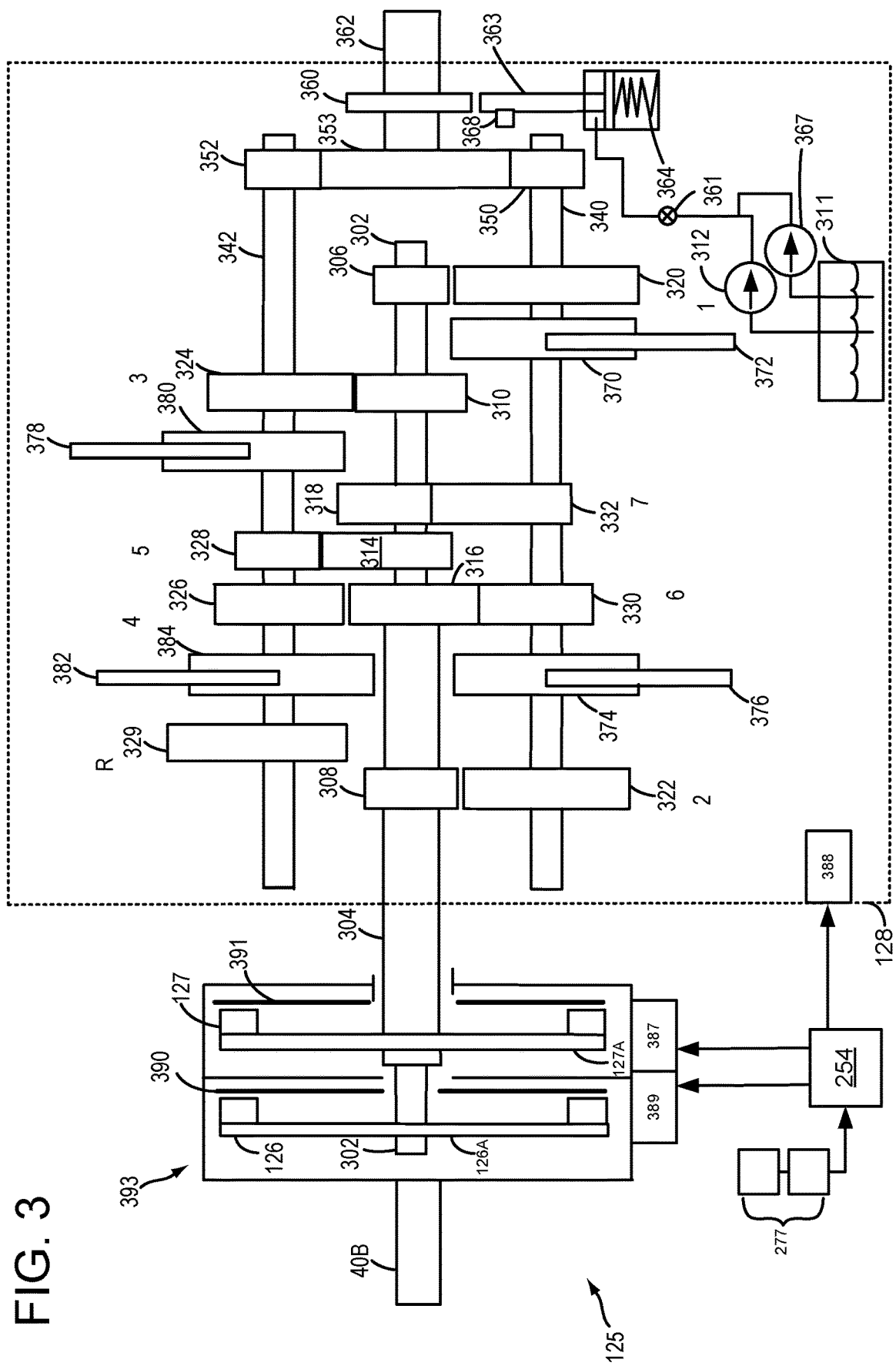
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 329, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 126 and second clutch 127 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. In some examples, during normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 329. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 329 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 328, or reverse gear 329. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, in some examples it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second layshaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 442), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being accomplished, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 125 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

As discussed above, there may be circumstances where a vehicle operator indicates a desire for increased vehicle acceleration, but where any increase in transmission assembly input torque responsive to the desired vehicle acceleration may exceed current transmission assembly input torque limits. Such examples may include a dual clutch transmission in a torque tracking mode of operation where a clutch torque capacity of an active clutch of the DCT is set to be above the transmission assembly input torque by a threshold amount. In such an example "active clutch" may be understood to refer to the particular clutch of the DCT that is at least partially closed, thus resulting in engine torque being transferred to the transmission via that particular clutch, while the other clutch is open.

Another example may include an upshift event where a vehicle operator suddenly steps into an accelerator pedal, where an increase in transmission input torque may be needed to accomplish the vehicle operator's request for more acceleration. In such an example, clutch torque capacity for the upshift may be scheduled based on the transmission assembly input torque requested at the start of the shift. Thus, if transmission input torque rises too quickly responsive to the vehicle operator stepping into the accelerator pedal, the clutch may not be able to increase torque capacity quickly enough, such that once the transmission input torque exceeds the clutch torque capacity, the transmission assembly input speed may start to accelerate and the shift may not finish. A still further example may include a situation where a clutch torque capacity may be incorrectly estimated to be large enough for an increase in transmission assembly input torque, but where the clutch does not have as much torque capacity as expected for a variety of reasons. In such an example, clutch slippage may result if the transmission assembly input speed is increased beyond the capacity of the clutch.

To illustrate the issue of a vehicle operator requesting an increase in vehicle acceleration while the dual clutch transmission is in a torque tracking mode, an example timeline 400 is shown at FIG. 4. Timeline 400 includes plot 405, indicating a position of an accelerator pedal (e.g. 192), over time. The accelerator pedal may be more depressed (+), or less depressed (−), where more depressed (+) indicates a vehicle operator demand for increased vehicle acceleration, or wheel torque. Timeline 400 further includes plot 410, indicating a vehicle operator-requested wheel torque, and plot 415, indicating an actual wheel torque, over time. Requested wheel torque demand and actual wheel torque may be increasing (+), or decreasing (−), for example. Timeline 400 further includes plot 420, indicating an amount of engine torque requested, for example responsive to a vehicle operator-requested amount of wheel torque, over time. Timeline 400 further includes plot 425, indicating a torque capacity of a clutch, over time. For example, plot 425 may indicate a limit, or capacity, in the amount of clutch torque applied to transmit engine torque through the transmission to driven wheels. In other words, if an engine is transmitting torque through the transmission via a first input shaft (e.g. 302), then plot 425 may refer to torque capacity limit of a first clutch (e.g. 126). If an engine is transmitting torque through the transmission via a second input shaft (e.g. 304), then plot 425 may refer to torque capacity limit of a second clutch (e.g. 127). Timeline 400 further includes plot 430, indicating a transmission input torque, over time. For plots 420, 425, and 430, increasing torque is illustrated as a (+), while decreasing torque is illustrated as a (−).

At time t0, the vehicle is in operation, and the vehicle operator is requesting a desired amount of wheel torque via pressing the accelerator pedal, indicated by plot 405. At time t0, wheel torque requested is equal to actual wheel torque, indicated by plots 410 and 415, respectively. An amount of engine torque, or transmission assembly input torque, indicated by plot 420, is capable of meeting the requested wheel torque, and is substantially equivalent to engine torque requested. Furthermore, a torque capacity of the clutch responsible for communicating engine torque through the transmission, illustrated by plot 425, is set a predetermined amount higher than torque input to the transmission, illustrated by plot 430.

At time t1, the vehicle operator steps into the accelerator pedal, requesting increased vehicle acceleration, or increased wheel torque. Thus, between time t1 and t2, wheel torque requested increases accordingly. Furthermore, engine torque requested increases according to the increased vehicle operator-requested demand for increased wheel torque. While not explicitly shown, in a case where a vehicle has an electric motor (e.g. ISG) upstream of the transmission, increased wheel torque may include a requested increase in engine torque plus an increase in electric motor torque input to the transmission, for example. However, because the transmission is in a torque tracking mode of operation, between time t1 and t2, the torque capacity of the clutch is only slowly ramped up, to prevent transmission input torque from rising above the clutch torque capacity. For example, if the transmission input torque were allowed to increase above the clutch torque capacity, then any excess transmission input torque may only accelerate the transmission input speed (e.g. crankshaft speed), result in a large slippage of the clutch, and not accelerate the vehicle. Accordingly, between time t1 and t2, clutch torque capacity is increased, and is maintained a predetermined amount, or threshold amount, above the transmission input torque, which also increases between time t1 and t2 in accordance with the increasing clutch torque capacity.

Thus, between time t1 and t2, actual wheel torque, indicated by plot 415 increases responsive to the increased demand for vehicle acceleration, but the rate at which wheel torque increases is a function of the clutch torque capacity, as the transmission is operating in a torque tracking mode.

At time t2, an amount of actual wheel torque meets the requested wheel torque, indicated by plots 415 and 410, respectively. More specifically, at time t2, clutch torque capacity is increased to a level whereby transmission input torque is substantially equivalent to the amount of engine torque requested to meet the driver-demanded wheel torque. Thus, between time t2 and t3, vehicle acceleration demand, indicated by plot 405, is met via the engine (or an engine plus an electric motor upstream of the transmission in some examples) providing transmission input torque to meet the requested wheel torque. With the transmission operating in the torque tracking mode, clutch torque capacity is maintained at the predetermined amount, or threshold, above the transmission input torque, between time t2 and t3.

As discussed above, benefits of torque tracking may include faster clutch opening time for shifting events due to the clutch not being locked at a maximum torque capacity possible, and less hydraulic pressure demand from a pump configured to deliver hydraulic fluid to the clutch. However, as indicated, responsive to a driver tip-in indicating a demand for increased vehicle acceleration, there may be a delay in the driver-demanded wheel torque requested, and actual wheel torque increasing to the demanded wheel torque. Such a delay may be perceived as hesitation to the vehicle operator. Accordingly, a solution that enables the transmission to operate in a torque tracking mode while still enabling wheel torque to increase in line with a driver-demanded request for increased wheel torque, is desired. Such a solution will be discussed in detail below with regard to method 600 depicted at FIG. 6.

Turning now to FIG. 5, an example timeline 500 depicting an upshift event for a dual clutch transmission, where a vehicle operator suddenly steps farther into an accelerator pedal during the upshift event. Timeline 500 includes plot 505 indicating a position of an accelerator pedal (e.g. 192), over time. The accelerator pedal may be more depressed (+), or less depressed (−), where more depressed (+) indicates a vehicle operator demand for increased vehicle acceleration, or wheel torque. Timeline 500 further includes plot 510 indicating a first speed of a first input shaft (e.g. 302), and plot 520, indicating a second speed of a second input shaft (e.g. 304), over time. Timeline 500 further includes plot 515, indicating an input speed to the transmission, or engine speed, over time. For plots 510, 515, and 520, increasing speeds are indicated via a (+), while decreasing speeds are indicated via a (−). Timeline 500 further includes plot 525, indicating a wheel torque requested via the vehicle operator, and plot 530, indicating an actual wheel torque, over time. For both plots 525 and 530, increasing torque is illustrated by a (+), while decreasing torque is illustrated by a (−). Timeline 500 further includes plot 535, indicating a requested transmission input torque amount, and plot 540, indicating an actual transmission input torque amount. For plots 535 and 540, increasing torque amounts are indicated via a (+), while decreasing torque amounts are indicated via a (−). Timeline 500 further includes plot 550, indicating a clutch torque capacity for an off-going clutch (e.g. first clutch 126), and plot 545, indicating a clutch torque capacity for an on-going clutch (e.g. second clutch 127), over time. For plots 545 and 550, increasing clutch torque capacity is illustrated via a (+), while decreasing clutch torque capacity is illustrated via a (−).

Referring to the dual clutch transmission illustrated at FIG. 3, for clarity it may be understood that in example timeline 500, first input shaft speed may refer to speed of a first input shaft (e.g. 302), and second input shaft speed may refer to speed of a second input shaft (e.g. 304). Furthermore, off-going clutch torque capacity may refer to clutch torque capacity of the first clutch (e.g. 126), while on-coming clutch torque capacity may refer to clutch torque capacity of the second clutch (e.g. 127). Furthermore, for clarity it may be understood that in example timeline 500, the upshift event may correspond to an upshift from a starting gear (e.g. first gear), to a target gear (e.g. second gear).

Between time t0 and t1 the vehicle is accelerating at a constant rate, with accelerator pedal position constant, illustrated by plot 505. First input shaft speed is increasing, illustrated by plot 510, as a first gear is engaged and the vehicle is undergoing acceleration at a constant rate. Requested wheel torque, indicated by plot 525, is substantially equivalent to actual wheel torque, indicated by plot 530. Similarly, requested transmission input torque, indicated by plot 535, is substantially equivalent to actual transmission input torque, indicated by plot 540. In other words, vehicle acceleration demand is substantially met via the engine providing the requested transmission input torque, thus enabling the requested level of wheel torque to be met via the engine. A capacity of the off-going clutch (e.g. 126), is substantially higher than the capacity of the on-coming clutch, indicated by plots 550 and 545, respectively. More specifically, it may be understood that engine torque between time t0 and t1 is being transmitted through the transmission to driven wheels via the first clutch (off-going clutch), while the second clutch (on-coming clutch) may be understood to be in an open configuration.

At time t1, capacity of the off-going clutch commences being reduced, indicated by plot 550. Furthermore, capacity of the on-coming clutch commences being increased, indicated by plot 545. More specifically, an upshift from a first gear to a second, target gear commences at time t1. Between time t1 and t2, as clutch torque capacity is further reduced for the off-going clutch, clutch torque capacity is further increased for the on-coming clutch.

At time t2, while the upshift event is in progress, the vehicle operator steps into the accelerator pedal, requesting an increase in vehicle acceleration. Accordingly, between time t2 and t3 requested wheel torque increases, indicated by plot 525, and requested transmission input torque increases, indicated by plot 535. More specifically, because an increase in wheel torque is requested by the vehicle operator demanding an increase in vehicle acceleration, the increase in wheel torque may be requested to be met via an increase in transmission input torque. In other words, an increase in engine torque (or in some examples engine torque plus motor torque, where the motor is upstream of the transmission) may be requested to meet the increase in requested vehicle acceleration. However, clutch torque capacity for the on-coming clutch may be scheduled based on a transmission input torque request at the start of the upshift event. For example, the clutch torque capacity for the on-coming clutch for the shift event depicted in timeline 500 may be understood to be scheduled prior to the vehicle operator-requested increase in vehicle acceleration. Thus, in such a circumstance where the vehicle operator steps into the accelerator pedal during the shift event, and where clutch capacity is set, if the transmission input shaft torque were to increase too quickly during the shift event, the clutch may not be able to increase clutch torque capacity as quickly. This may result in the transmission input torque exceeding the clutch torque capacity, which may result in the transmission assembly input speed accelerating. An accelerating transmission input assembly input speed may thus result in the shift not concluding, as an upshift necessitates a decrease in transmission assembly input speed (e.g. crankshaft speed).

To avoid such an occurrence, between time t2 and t3, as capacity on the off-going clutch is reduced, transmission assembly input torque may be limited as a function of the capacity of the on-coming clutch. Accordingly, with transmission assembly input torque limited, actual wheel torque, indicated by plot 530 is not equivalent to requested wheel torque, indicated by plot 525. Similarly, actual transmission assembly input torque, indicated by plot 540, is not equivalent to requested transmission input torque, indicated by plot 535. More specifically, actual wheel torque is less than requested wheel torque, and actual transmission input torque is less than requested transmission input torque, a function of the scheduled capacity of the on-coming clutch.

At time t3, capacity on the off-going clutch reduces such that it may be understood that the off-going clutch is open at time t3. Furthermore, at time t3, transmission input speed (or engine speed), indicated by plot 515, may be commanded to be reduced to synchronize with a speed of the second input shaft, such that the shift event may be finished, or concluded. Reduction in transmission input speed (e.g. crankshaft speed) may be accomplished via one or more engine torque actuators (e.g. 204), for example.

Accordingly, between time t3 and t4, transmission input speed is reduced to synchronize transmission input speed, indicated by plot 515, with the speed of the second input shaft, indicated by plot 520. Discussed herein, synchronized transmission input speed with the speed of the second input shaft may be understood to be when transmission input speed and second input shaft speed are within a threshold speed of each other (e.g. within 5% of each other). It may be understood that the speed of the second input shaft may be a function of the second, target gear. Furthermore, between time t3 and t4, capacity on the on-coming clutch is increased. However, the increased torque capacity on the on-coming clutch is lower than a clutch torque capacity to enable actual wheel torque to match requested wheel torque, and similarly, for actual transmission assembly input torque to match requested transmission assembly input torque. More specifically, as discussed above, transmission assembly input torque is limited by the capacity of the on-coming clutch.

At time t4, transmission assembly input speed is synchronized with the speed of the second input shaft. Thus between time t4 and t5, torque capacity on the oncoming clutch is at the level scheduled prior to the shift event. Furthermore, between time t4 and t5 actual wheel torque, indicated by plot 530, and actual transmission assembly input torque, continue to rise as a function of the oncoming clutch torque capacity. At time t5, actual wheel torque is substantially equivalent to requested wheel torque, and actual transmission input torque is substantially equivalent to requested transmission input torque. With the shift event concluded at time t5, the vehicle is operated in the second gear between time t5 and t6, with all engine torque being transmitted through the transmission via the on-coming clutch.

By controlling transmission input torque as a function of torque capacity of the on-coming clutch as depicted by timeline 500 in FIG. 5, responsive to the driver's request for acceleration, a vehicle operator may perceive the delay in acceleration as hesitation. Furthermore, the engine may not immediately rev up as expected by the vehicle operator responsive to the substantial change in accelerator pedal position. Accordingly, systems and methods are desired which would enable a shift event to be concluded, or finished, while ensuring a request for vehicle acceleration is met during an upshift event where the vehicle operator steps into the accelerator pedal. Such an example method will be discussed in detail below with regard to FIG. 6.

In another example, consider a situation where a clutch torque capacity is estimated to be large enough for an increase in transmission assembly input torque responsive to driver demanded increase in vehicle acceleration, but where in reality the clutch does not have as much torque capacity as expected. For example, such a discrepancy may be the result of clutch degradation, degraded sensor readings, or an anomaly in the clutch torque estimation algorithm. In such a case, if transmission assembly input torque is increased above the clutch torque capacity, the transmission assembly input speed (e.g. crankshaft speed) may increase above the corresponding input shaft speed, resulting in clutch slip. A method to avoid such an occurrence will be discussed in detail below with regard to FIG. 6.

Turning now to FIG. 6, a high level example method 600 is shown for enabling driver-demanded vehicle acceleration requests to be met under circumstances where a clutch of a dual clutch transmission is in a torque tracking mode, where the request for vehicle acceleration occurs during a shift event, and/or under circumstances where clutch torque capacity may be incorrectly estimated to be large enough for an increase in transmission assembly input torque, but where in reality the clutch does not have as much torque capacity as expected. More specifically, in each of the above-mentioned cases, an electric machine/motor may be utilized in addition to engine torque to meet the driver-demanded vehicle acceleration, as will be discussed in detail below.

Method 600 will be described with reference to the systems described herein and shown in FIGS. 1A-3, though it should be understood that similar methods may be applied to other systems without departing from the scope of this disclosure. Method 600 may be carried out by a controller, such as controller 12 in FIG. 1A, and may be stored at the controller as executable instructions in non-transitory memory. Instructions for carrying out method 600 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as ISG (e.g. 142), electric machine (e.g. 120), electric motor(s) (e.g. 133a, 133b), engine torque actuator(s) (e.g. 204), selector forks (e.g. 372, 376, 378, 382), first clutch (e.g. 126), second clutch (e.g. 127), etc., according to the method depicted below.

Method 600 begins at 605 and may include indicating whether a demand for an increase in vehicle acceleration has been requested by a vehicle operator while the vehicle is in operation. For example, such an indication may include a determination that an accelerator pedal (e.g. 192) has been stepped into (e.g. pressed down in a manner indicative of a request for increased vehicle acceleration). In some examples, such an indication may comprise a change in accelerator pedal position greater than a threshold accelerator pedal position change. If, at 605, it is indicated that the vehicle operator is not requesting an increase in vehicle acceleration, method 600 may proceed to 610. At 610, method 600 may include maintaining vehicle operating conditions. For example, if the vehicle is being propelled via the engine, then engine operating conditions may be maintained. In some examples, the vehicle may be being propelled solely via power from an electric machine (e.g. 120), and/or electric motors (e.g. 133a, 133b). In such an example, vehicle operating conditions comprising propelling the vehicle via electric power may be maintained. Still further, there may be examples where the vehicle is being propelled by a combination of power from the engine and power from one or more electric machines/motors. In such examples, vehicle operating conditions may be maintained such that the vehicle is continued to be operated via a combination of engine power and power from the one or more electric machines. Method 600 may then end.

Returning to 605, if it is indicated that the vehicle operator has requested an increase in vehicle acceleration, method 600 may proceed to 615. At 615, method 600 may include estimating clutch torque(s). At 615, clutch torque(s) may be estimated via any means known in the art. For example, clutch torque(s) may be estimated via an observer theory of control engineering which may comprise a method of calculating a torque that occurs when a clutch disc slips based on an engine torque. In another example, clutch torque(s) may be estimated simply by using a value of the commanded torque(s). In still another example, clutch torque(s) may be estimated using a torque measurement device.

Responsive to an estimate of clutch torque(s) being indicated at 615, method 600 may proceed to 620. At 620, method 600 may include determining desired transmission assembly input torque to meet driver demanded wheel torque. For example, it may be determined at 620 how much transmission assembly input torque may result in meeting driver demanded wheel torque. In some examples, determining desired transmission assembly input torque may include additionally determining a desired amount of electric machine (e.g. 120) or electric motor (e.g. 133a, 133b) torque, such that desired transmission assembly input torque may comprise a wheel torque demand minus desired electric machine/motor torque.

Proceeding to 625, method 600 may include indicating whether a gear upshift event is in progress at the time of the vehicle operator-requested increase in vehicle acceleration. As discussed above, an upshift event for a dual clutch transmission may involve shifting from a first, lower gear (e.g. first gear 320) to a second, higher gear (e.g. second gear 322). Such an event may include a capacity of an off-going clutch being reduced, while capacity to the on-coming clutch may be increased. In an example where the shift event comprises a shift from first gear (e.g. 320) to second gear (e.g. 322), the off-going clutch may comprise first clutch (e.g. 126), and the on-coming clutch may comprise second clutch (e.g. 127). Such an example is provided for clarity, but it may be understood that any upshift event may comprise shifting from a lower gear to a higher gear.

In a case of an upshift event, clutch torque capacity for the on-coming clutch may be scheduled at the beginning of the upshift event. Thus, it may be understood that, at 625, if an acceleration request is indicated during the upshift event, a clutch torque capacity for the on-coming clutch may already be scheduled by the vehicle controller.

Accordingly, at 625, if it is indicated that an upshift event is in progress at the time of the vehicle operator-requested increase in vehicle acceleration, method 600 may proceed to 630. At 630, method 600 may include increasing engine torque and simultaneously charging with ISG (e.g. 142) torque. More specifically, responsive to the request for the increase in vehicle acceleration, engine torque may be increased via one or more engine torque actuator(s) (e.g. 204). Examples may include an increase in rate or amount of fuel injected from fuel injectors (e.g. 66B) to one or more engine cylinder combustion chamber(s) (e.g. 30B), increase in amount of air provided to the engine via commanding a throttle (e.g. 62B) to a more open position, etc. At the same time, the vehicle controller may command a negative torque via the ISG (e.g. 142). For example, the negative torque commanded via the ISG may offset the increase in engine torque, such that transmission assembly input torque is maintained substantially constant while engine torque is increased, with the torque from the engine going to charging the electrical energy storage device (e.g. 132). More specifically, a second inverter system controller (e.g. 143) may receive alternating current from the ISG (e.g. 142), and may convert said alternating current to direct current for storage at energy storage device 132. By allowing engine torque to increase, transmission assembly input torque may be quickly increased by modulating the ISG torque once there is sufficient clutch torque capacity to enable an increase transmission assembly input torque, as will be discussed in further detail below.

Proceeding to 635, method 600 may include controlling clutch torque capacity to the clutch torque capacity scheduled as a function of the shift event. For example, there may be a rate at which clutch pressure is increased for the on-coming clutch, which may be a function of clutch torque capacity scheduled for the shift. Accordingly, in one example, at 635, the rate at which on-coming clutch capacity is increased, and a value of clutch torque capacity that the clutch may reach just prior to an inertia phase of the shift, may be controlled at the rate specified or scheduled at the beginning of the shift, such that the value of clutch torque capacity reached just prior to the inertia phase of the upshift may be that scheduled at the beginning of the shift. However, in another example, clutch capacity may be increased at a rate greater than that scheduled for the shift, and wherein clutch capacity may reach a value higher than that scheduled as a function of the shift, responsive to an indication of a request for vehicle acceleration.

Thus, it may be understood that scheduled clutch torque capacity may likely be below the desired transmission assembly input torque responsive to a request for vehicle acceleration. The reason may be because the clutch torque capacity is scheduled at the beginning of the shift, as discussed above, without accounting for a driver-demanded increase in vehicle acceleration. Accordingly, to meet wheel torque demand, an electric machine (e.g. 120), or one or more electric motor(s) (e.g. 133a, 133b) may be controlled to provide additional torque to the driveline to meet the wheel torque demand.

Accordingly, continuing to 640, method 600 may include increasing either electric machine (e.g. 120) torque or electric motor torque (e.g. 133*a*, 133*b*) to meet wheel torque demand. More specifically, an amount of wheel torque provided via the electric machine/motor(s) to meet wheel torque demand may comprise a difference between transmission assembly input torque (plus any amount of electric machine/motor torque already providing torque to the wheels) and total wheel torque demand. For example, as discussed above, if an amount of transmission assembly input torque is limited by clutch torque capacity scheduled at the beginning of the upshift, then it may not be possible to increase transmission assembly input torque to the desired transmission assembly input torque, to meet requested wheel torque demand. Thus, to meet wheel torque demand, the difference between desired transmission input torque and transmission input torque possible without exceeding the scheduled clutch torque capacity, may be made up via the electric machine, or electric motor(s).

In some examples where a vehicle system comprises both an electric machine (e.g. 120), and one or more electric motor(s) (e.g. 133*a*, 33*b*), determining whether to use the electric machine, the one or more motors (e.g. 133*a*, 133*b*), or some combination of the electric machine and motor(s), to make up a difference between total wheel torque demanded and wheel torque provided via the engine (based on transmission input torque limits due to the scheduled clutch torque capacity), may involve a determination of which motor may be most efficient. For example, efficiency of electric machine(s)/motor(s) may be a function of temperature, speed, and amount of torque desired. Thus, depending on the difference between total wheel torque demanded and the amount of transmission assembly input torque provided via the engine, it may be determined what electric machine/motor may be most effective for adding in the wheel torque to enable wheel torque to meet the requested wheel torque.

Alternatively, in a case where the vehicle system only includes either an electric machine (e.g. 120), or one or more motor(s) (133*a*, 133*b*), then the difference between wheel torque demanded and the amount of transmission assembly input torque provided via the engine, may be made up via either the electric machine (e.g. 120), or electric motor(s) (133*a*, 133*b*), depending on whether the vehicle system includes an electric machine, or electric motor(s).

While not explicitly illustrated in method 600, it may be understood that the electric machine (e.g. 120) and/or electric motor(s) (e.g. 133*a*, 133*b*) may produce torque output in order to meet wheel torque demand, until it is indicated that the upshift is event is concluded, where the upshift being concluded is indicated in response to transmission assembly input speed decreasing to a synchronous speed of the input shaft associated with the on-coming clutch, such that the desired, or target gear for the shift may be engaged via its appropriate synchronizer.

Continuing to 645, responsive to an indication that the shift event is concluded, method 600 may include increasing clutch torque capacity (on-coming clutch torque capacity) above the desired transmission assembly input torque. More specifically, clutch torque capacity may be increased to a capacity whereby the desired transmission assembly input torque may be achieved, without resulting in clutch slippage, for example. As an example, a transmission control module (e.g. 254), or vehicle controller, may adjust an actuator of the on-coming clutch (e.g. 127) to increase the capacity of the clutch to a level above the desired transmission assembly input torque. As discussed, increasing clutch torque capacity above the desired transmission input torque may occur responsive to the shift completing, where a shift being concluded includes a condition where a transmission input speed (e.g. crankshaft speed, or engine speed) decreases to a speed determined by the new gear ratio (e.g. the gear ratio engaged by the second gear, in a situation where an upshift includes a shift from a first, lower gear, to a second, higher gear), and when the on-coming clutch is carrying the full transmission input torque. Increasing clutch torque capacity above the desired transmission input torque responsive to the shift event being concluded, will be discussed in further detail below with regard to the timeline 800 depicted below.

With the capacity of the clutch increased to above the desired transmission assembly input torque, method 600 may proceed to 650. At 650, method 600 may include increasing transmission assembly input torque to the desired transmission assembly input torque, while simultaneously lowering either electric machine (e.g. 120) torque, or electric motor (e.g. 133*a*, 133*b*) torque, or both of the electric machine torque and electric motor torque(s) in a case where the vehicle system includes both an electric machine (e.g. 120) and electric motor(s) (e.g. 133*a*, 133*b*). Increasing transmission assembly input torque may be accomplished by reducing the negative torque provided via the ISG (e.g. making ISG torque less negative), for example, as will be illustrated in further detail with regard to the timeline depicted at FIG. 8. In some examples, electric machine and/or motor torque(s) may be lowered to a level where the electric machine/motor(s) are not providing significant torque to meet wheel torque demand. In such an example, it may be understood that wheel torque demand may be met solely via transmission input torque at 650, responsive to the clutch torque capacity being increased above the desired transmission assembly input torque. However, in some examples, the electric machine/motor torque(s) may only be reduced to a level defined by a most efficient mode of providing the wheel torque demand. In such an example, wheel torque demand may be met by some combination of engine torque and electric machine/motor torque(s). Method 600 may then end.

Returning to 625, responsive to a driver-demanded request for vehicle acceleration, and further responsive to an indication that a gear upshift event is not in progress, method 600 may proceed to 655. At 655, method 600 may include indicating whether the clutch torque capacity estimated at step 615 of method 600, is below the desired transmission assembly input torque, where desired transmission assembly input torque comprises the desired transmission assembly input torque determined at step 620 of method 600. If, at 655, the estimated clutch torque capacity is indicated to be less than the desired transmission assembly input torque as a result of driver-demanded vehicle acceleration, method 600 may proceed to 660. At 660, method 600 may include increasing engine torque and simultaneously charging with ISG (e.g. 142) torque, as discussed above at step 630 of method 600. Briefly, engine torque may be increased via one or more engine torque actuator(s) (e.g. 204), while at the same time, the vehicle controller may command a negative torque via the ISG. Accordingly, the negative torque commanded via the ISG may offset the increase in engine torque, such that transmission assembly input torque may be maintained substantially constant, with torque from the engine going to charging the electrical energy storage device (e.g. 132), as discussed above. In this way, transmission assembly input torque may be quickly increased by modulating the ISG torque once there is sufficient clutch torque capacity to enable an increase transmission assembly input torque, as will be discussed in further detail below.

Proceeding to 640, method 600 may include increasing either or both of electric machine (e.g. 120) torque and/or electric motor torque (e.g. 133a, 133b) (depending on whether the vehicle system is equipped with an electric machine, electric motor(s), or both) to meet wheel torque demand, as discussed above. Specifically, for a non-shifting event in a dual clutch transmission, an amount of transmission input torque that may be commanded without resulting in clutch slippage may be determined by the torque capacity of the active clutch, where the active clutch may comprise the clutch responsible for transferring engine torque to the driven wheels through the transmission. Accordingly, an amount of transmission assembly input torque that may be commanded, may be determined/calculated as a function of the torque capacity of the active clutch. By subtracting the calculated amount of transmission input torque possible (given the active clutch capacity) from total wheel torque demand responsive to the acceleration request from the vehicle operator, an amount of electric machine/motor torque(s) to meet the wheel torque demand may be determined.

As discussed above, in some examples, determining whether to use the electric machine (e.g. 120), or one or more electric motor(s) (e.g. 133a, 133b), or some combination of electric machine/motor torque to make up the difference between total wheel torque demanded and wheel torque provided via the engine (based on transmission input torque limit), may involve a determination of which motor may be most efficient (in an example where the vehicle system includes both the electric machine and electric motor(s). For example, efficiency of electric machine(s)/motor(s) may be a function of temperature, speed, and amount of torque desired. Thus, depending on the difference between total wheel torque demanded and the amount provided via the engine, it may be determined what electric machine/motor may be most effective for adding in the wheel torque to enable wheel torque to meet the requested wheel torque. Alternatively, in a case where the vehicle system only includes either an electric machine (e.g. 120), or electric motor(s) (e.g. 133a, 133b), then only either the electric machine, or the electric motors may be utilized, as discussed above.

Continuing to 645, method 600 may include increasing clutch torque capacity above the desired transmission assembly input torque, where desired transmission assembly input torque may be understood to be the desired amount of transmission assembly input torque determined at step 620 of method 600. More specifically, clutch torque capacity may be increased to a capacity whereby the desired transmission assembly input torque may be achieved via engine torque, without resulting in clutch slippage, for example. As an example, a transmission control module (e.g. 254), or vehicle controller, may adjust an actuator of the active clutch to increase the capacity of the clutch to a level above the desired transmission assembly input torque.

With the capacity of the active clutch increased to above the desired transmission assembly input torque, method 600 may proceed to 650. At 650, method 600 may include increasing transmission assembly input torque to the desired transmission assembly input torque, while simultaneously lowering either or both of the electric machine (e.g. 120) and/or electric motor(s) (e.g. 133a, 133b). Increasing transmission assembly input torque may be accomplished by reducing the negative torque provided via the ISG (e.g. making ISG torque less negative), for example, as will be illustrated in further detail with regard to the timeline depicted at FIG. 8. By increasing transmission assembly input torque to the desired transmission assembly input torque, while lowering electric machine/motor torque(s), the driver demanded wheel torque may be met. As discussed above, in some examples, electric machine and/or motor torque(s) may be lowered to a level where the electric machine/motor(s) are not providing significant torque to meet wheel torque demand. In such an example, it may be understood that wheel torque demand may be met solely via transmission input torque at 650, responsive to the clutch torque capacity being increased above the desired transmission assembly input torque. However, in some examples, the electric machine/motor torque(s) may only be reduced to a level defined by a most efficient mode of providing the wheel torque demand. In such an example, wheel torque demand may be met by some combination of engine torque and electric machine/motor torque(s). Method 600 may then end.

Returning to 655, responsive to an indication that estimated clutch torque capacity is not less than desired transmission assembly input torque, method 600 may proceed to 665. At 665, method 600 may include determining whether unexpected clutch slip is detected as a result of increasing transmission assembly input torque to the desired transmission assembly input torque, responsive to the request for vehicle acceleration (where the desired transmission assembly input torque is estimated to be lower than the estimated clutch torque capacity). As an example, clutch slip may be indicated via comparing output from two speed sensors. For example an engine position sensor (e.g. 118B) and a transmission output position sensor (e.g. 272) may be utilized to determine clutch slippage. If engine speed is not indicated to be within a threshold speed of a transmission output shaft (e.g. 362), clutch slippage may be indicated. Responsive to an indication of clutch slippage, under conditions where clutch slippage is not expected based on estimates of clutch torque capacity and transmission assembly input torque (e.g. where it is expected that clutch torque capacity is greater than transmission assembly input torque), method 600 may proceed to 670. At 670, method 600 may include reducing transmission assembly input torque until it is indicated that the clutch is not slipping (e.g. engine speed and transmission output shaft speed within a predetermined threshold of each other, for example within less than 5% of each other). Specifically, the engine position sensor (e.g. 118B) and the transmission output sensor (e.g. 272) may be monitored while transmission assembly input torque is reduced, until it is indicated that transmission assembly input speed (e.g. crankshaft speed) is substantially equivalent to transmission output shaft speed. Furthermore, reducing transmission assembly input torque may be accomplished via either applying negative torque via the ISG (e.g. 142), or via commanding less engine torque. Commanding less engine torque may include engine controller (e.g. 111B) commanding torque actuator(s) (e.g. 204) to control the engine to produce less engine torque. As an example, torque actuator(s) may include fuel injectors, throttle, etc. Thus, commanding less engine torque may include lowering an amount of fuel injected to the cylinders, decreasing an amount of air provided to the engine via actuating the throttle to a more closed position, etc. In some examples, a determination as to whether to lower engine torque, or whether to maintain engine torque constant but increase a negative torque applied via the ISG, may be a function of a state of charge of the onboard energy storage device (e.g. 132). For example, if charging of the onboard energy storage device is desired, then negative ISG torque may be utilized to lower engine torque. Alternatively, responsive to an indication that charging of the onboard energy storage device is not desired, or needed, the reduction in transmission assembly input torque may be achieved via commanding torque actuator(s) (e.g. 204) to produce less engine torque.

Proceeding to 675, method 600 may include adapting the clutch torque estimate indicated at step 615. For example, because the clutch is undergoing unexpected slip, it may be understood that the clutch torque estimate may be incorrect. Thus, at 675, method 600 may comprise indicating a new value for the clutch torque estimate, as a function of transmission input torque. For example, as discussed above, transmission assembly input torque may be reduced until it is indicated that the clutch is not slipping. At such a point, it may be determined that the clutch may be capable of carrying the amount of transmission assembly input torque. Accordingly, the clutch torque estimate may be updated, or adapted, to the new learned value at 675. In some examples, adapting the clutch torque estimate at 675 may include updating a clutch torque transfer function, which relates clutch pressure, to clutch torque capacity, for example. More specifically, such a transfer function may describe a relationship between a torque transfer capacity and a pressure applied to the clutch to provide the torque transfer capacity. The relationship may be described by a curve or a series of points that may be interpolated between. The transfer function may be adapted by replacing inaccurate values of the transfer function with more accurate values.

In an example condition where transmission assembly input torque was reduced due to an indication of clutch slippage, then the vehicle acceleration demand may not be met unless the difference between transmission assembly input torque and wheel torque demand is accounted for. Accordingly, at 680, method 600 may include increasing either or both of electric machine (e.g. 120) torque and/or electric motor torque (e.g. 133a, 133b) to meet wheel torque demand. As discussed, an amount of wheel torque provided via the electric machine/motor(s) to meet wheel torque demand may comprise a difference between transmission assembly input torque and total wheel torque demand. As further discussed above, in some examples determining whether to use the electric machine (e.g. 120), the one or more motors (e.g. 133a, 133b), or some combination to make up the difference between total wheel torque demanded and wheel torque provided via the engine, may involve a determination of which motor may be most efficient (in a case where the vehicle system includes both electric machine (e.g. 120) and electric motor(s) (e.g. 133a, 133b).

Continuing to 645, method 600 may include increasing clutch torque capacity above the desired transmission assembly input torque, where desired transmission assembly input torque may be understood to be the desired amount of transmission assembly input torque determined at step 620 of method 600. More specifically, clutch capacity may be increased to a capacity whereby the desired transmission assembly input torque may be achieved, without resulting in clutch slippage, for example. As an example, a transmission control module (e.g. 254) may adjust an actuator of the active clutch to increase the capacity of the clutch to a level above the desired transmission assembly input torque.

With the capacity of the active clutch increased to above the desired transmission assembly input torque, method 600 may proceed to 650. At 650, method 600 may include increasing transmission assembly input torque to the desired transmission assembly input torque, while simultaneously lowering either or both of the electric machine (e.g. 120) torque and/or electric motor torque. By increasing transmission assembly input torque to the desired transmission assembly input torque, while lowering electric machine/motor torque, the driver demanded wheel torque may be met. Method 600 may then end.

Returning to 665, responsive to the vehicle operator's demand for increased vehicle acceleration, and further responsive to an indication that an upshift event is not in progress, that estimated clutch torque capacity is not lower than desired transmission assembly input torque, and further responsive to an indication that unexpected clutch slip is not detected, method 600 may proceed to 685. At 685, method 600 may include increasing transmission assembly input torque to the desired transmission assembly input torque such that driver demanded wheel torque may be met. As an example, increasing transmission assembly input torque may be achieved via the engine controller (e.g. 111B) commanding one or more torque actuator(s) (e.g. 204) to increase torque production of the engine, to meet the desired transmission assembly input torque. For example, fuel injection to one or more engine cylinders may be increased, a throttle may be commanded to a more open position to enable more air flow to the engine, etc. Method 600 may then end.

Turning now to FIG. 7, an example timeline 700 illustrating the use of one or more electric machine(s)/motor(s) to enable a driver-demanded request for vehicle acceleration to be met, under conditions where a clutch of a dual clutch transmission is being operated in a clutch torque tracking mode, is shown. Timeline 700 includes plot 705, indicating a position of an accelerator pedal (e.g. 192), over time. The accelerator pedal may be more depressed (+), or less depressed (−), where more depressed (+) indicates a vehicle operator demand for increased vehicle acceleration, or wheel torque. Timeline 700 further includes plot 710, indicating a vehicle operator-requested wheel torque, plot 715, indicating an actual wheel torque, and plot 720, indicating an electric machine (e.g. 120) torque, over time. For each of plots 710, 715 requested wheel torque demand and actual wheel torque, respectively, may be increasing (+), or decreasing (−), for example. Similarly, for plot 720 electric machine (e.g. 120) torque may be increasing (+), or decreasing (−). As discussed above, in some examples a vehicle system may include either an electric machine (e.g. 120), electric motor(s) (e.g. 133a, 133b), or both. However, for simplicity, in this example timeline, it may be understood that the vehicle system only includes an electric machine (e.g. 120).

Timeline 700 further includes plot 725, indicating an amount of engine torque requested, or desired transmission assembly input torque, responsive to a vehicle operator-requested amount of wheel torque, over time. Timeline 700 further includes plot 730, indicating a torque capacity of a clutch, over time. For example, plot 730 may indicate a torque capacity of a clutch that is transferring engine torque through the transmission to driven wheels, for example. In other words, if an engine is transmitting torque through the transmission via a first input shaft (e.g. 302), then plot 730 may refer to torque capacity of the first clutch. Alternatively, if an engine is transmitting torque through the transmission via a second input shaft (e.g. 304), then plot 730 may refer to torque capacity of a second clutch (e.g. 127). Timeline 700 further includes plot 735 indicating an actual transmission input torque, over time. Timeline 700 further includes plot 740, indicating a torque supplied via an integrated starter/generator (ISG) (e.g. 142), over time. For plots 725, 730, 735, and 740, increasing torque is illustrated as a (+), while decreasing torque is illustrated as a (−).

At time t0, the vehicle is in operation, and the vehicle operator is requesting a desired amount of wheel torque via pressing the accelerator pedal, indication by plot 705. At time t0, wheel torque requested is substantially equivalent to actual wheel torque, indicated by plots 710 and 715, respectively. Furthermore, transmission assembly input torque, indicated by plot 735, is substantially equivalent to requested engine torque, indicated by plot 725. The electric machine is not contributing torque to the driveline at time t0, indicated by plot 720. At time t0, torque capacity of the clutch responsible for communicating engine torque through the transmission, illustrated by plot 730, is set a predetermined amount higher than torque input to the transmission, illustrated by plot 735. Still further, the ISG (e.g. 142) is not contributing either positive or negative torque to the driveline, illustrated by plot 740.

At time t1, the vehicle operator steps into the accelerator pedal, requesting increased vehicle acceleration, or increased wheel torque. Thus, between time t1 and t2, wheel torque requested increases accordingly. Furthermore, engine torque requested (desired transmission input torque) increases according to the increased vehicle operator-requested demand for increased wheel torque. Because the transmission is being operated in a clutch torque tracking mode of operation, if the transmission assembly input torque was increased responsive to the vehicle operator-requested increase in vehicle acceleration, such an increase may result in clutch slippage, and such an action may not accelerate the vehicle, as discussed above. To satisfy the vehicle operator's desire for increased vehicle acceleration, between time t1 and t2, the electric machine (e.g. 120), may be utilized to enable driver demanded wheel torque to be met, while maintaining transmission assembly input torque below the clutch capacity. Thus, torque from the electric machine is indicated to increase between time t1 and t2, to account for a difference between driver demanded wheel torque and actual wheel torque. Accordingly, with the electric machine recruited to provide wheel torque, actual wheel torque, indicated by plot 715, becomes substantially equivalent to requested wheel torque by time t2.

Furthermore, between time t1 and t2, the ISG (e.g. 142) is commanded to provide a negative torque, indicated by plot 740, to offset an increase in combustion engine torque. For example, the engine controller (e.g. 111B) may command engine torque actuator(s) (e.g. 204) to increase engine torque between time t1 and t2, yet transmission input torque may remain constant as engine torque is offset by the negative ISG torque.

Between time t2 and t3, negative ISG torque is held constant, indicated by plot 740. Additionally, electric machine torque is held constant, indicated by plot 720. Between time t3 and t4, the torque capacity of the clutch is increased, and accordingly, as the clutch torque capacity is increased, transmission assembly input torque is controlled to increase concurrently. More specifically, clutch torque capacity may be understood to be increased via a transmission control module (e.g. 254) commanding a clutch actuator (e.g. 389 or 387 depending on the clutch that is active) to increase the torque capacity of the clutch. Furthermore, transmission assembly input torque is increased by reducing (making less negative) the negative ISG torque.

At time t4, clutch torque capacity, indicated by plot 730, is greater than desired transmission assembly input torque, or engine torque, indicated by plot 725. With clutch torque capacity greater than desired transmission assembly input torque, actual transmission assembly input torque, indicated by plot 735, is substantially equivalent to desired transmission assembly input torque. Furthermore, at time t4, electric machine torque is no longer contributing torque to the wheels, indicated by plot 720, and the ISG is no longer operating at a negative torque, indicated by plot 740. Between time t4 and t5, the transmission is operated in a torque tracking mode, with the clutch torque capacity, indicated by plot 730 a defined amount above the transmission assembly input torque, indicated by plot 735.

Thus, by employing the electric machine downstream of the dual clutch transmission under conditions where the transmission is operating in a torque tracking mode of operation, driver-demanded vehicle acceleration requests may be met without significant delay, as would otherwise occur in a vehicle not equipped with an electric machine downstream of the transmission.

Turning now to FIG. 8, an example timeline 800 illustrating the use of one or more electric machine(s)/motor(s) to enable a driver-demanded request for vehicle acceleration to be met, under conditions where a shifting event is in progress, is shown. Timeline 800 includes plot 805 indicating a position of an accelerator pedal (e.g. 192), over time. As discussed above, the accelerator pedal may be more depressed (+), or less depressed (−), where more depressed (+) indicates a vehicle operator demand for increased vehicle acceleration, or wheel torque. Timeline 800 further includes plot 810, indicating a first speed of a first input shaft (e.g. 302), and plot 820, indicating a second speed of a second input shaft (e.g. 304), over time. Timeline 800 further includes plot 815, indicating an input speed to the transmission, or engine speed, over time. For plots 810, 815, and 820, increasing speeds are indicated via a (+), while decreasing speeds are indicated via a (−). Timeline 800 further includes plot 825, indicating a wheel torque requested via the vehicle operator, and plot 830, indicating an actual wheel torque, over time. Timeline 800 further includes plot 835, indicating an electric machine (e.g. 120) torque, over time. As discussed above in some example a vehicle system may include either or both of an electric machine (e.g. 120) and electric motor(s) (e.g. 133a, 133b). However, for simplicity, it may be understood that the vehicle system depicted at FIG. 8 only includes an electric machine (e.g. 120). For plots 825, 830, and 835, increasing torque is illustrated by a (+), while decreasing torque is illustrated by a (−).

Timeline 800 further includes plot 840, indicating a requested (desired) transmission input torque amount, and plot 845, indicating an engine torque amount, over time. Timeline 800 further includes plot 850, indicating a transmission input torque amount, and plot 855, indicating an amount of torque provided via an ISG (e.g. 142), over time. For plots 840, 845, 850, and 855, increasing torque amounts are indicated via a (+), while decreasing torque amounts are indicated via a (−). Timeline 800 further includes plot 865, indicating a clutch torque capacity for an off-going clutch (e.g. first clutch 126), and plot 860, indicating a clutch torque capacity for an on-coming clutch (e.g. second clutch 127), over time. For plots 860 and 865, increasing clutch torque capacity is illustrated via a (+), while decreasing clutch torque capacity is illustrated via a (−).

Referring to the dual clutch transmission illustrated at FIG. 3, for clarity it may be understood that in example timeline 800, first input shaft speed may refer to speed of a first input shaft (e.g. 302), and second input shaft speed may refer to speed of a second input shaft (e.g. 304). Furthermore, off-going clutch capacity may refer to clutch torque capacity of the first clutch (e.g. 126), while on-coming clutch torque capacity may refer to clutch torque capacity of the second clutch (e.g. 127). Furthermore, for clarity it may be understood that in example timeline 800, the upshift event may correspond to an upshift from a starting gear (e.g. first gear), to a target gear (e.g. second gear).

Between time t0 and t1, the vehicle is accelerating at a constant rate, with accelerator pedal position constant, illustrated by plot 805. First input shaft speed is increasing, illustrated by plot 810, as a first gear is engaged and the vehicle is undergoing acceleration at a constant rate. Requested wheel torque, indicated by plot 825, is substantially equivalent to actual wheel torque, indicated by plot 830. The electric machine is not providing substantial torque to the wheels, indicated by plot 835, and plot 855. Accordingly, wheel torque requested may be understood to be being met via torque supplied via the engine. As such, torque supplied via the engine, indicated via plot 845, is substantially equivalent to requested transmission input torque amount, indicated by plot 840. Furthermore, a capacity of the off-going clutch (e.g. 126) is substantially higher than the capacity of the on-coming clutch (e.g. 127), indicated by plots 865 and 860, respectively. More specifically, it may be understood that engine torque between time t0 and t1 is being transmitted through the transmission to driven wheels via the first clutch (off-going clutch), while the second clutch (on-coming clutch) may be understood to be in an open configuration.

At time t1, capacity of the off-going clutch commences being reduced, indicated by plot 865. Furthermore, capacity of the on-coming clutch commences being increased, indicated by plot 860. More specifically, an upshift from a first gear to a second, target gear, commences at time t1. Between time t1 and t2, as capacity is further reduced for the off-going clutch, capacity is further increased for the on-coming clutch.

At time t2, while the upshift event is in progress, the vehicle operator steps into the accelerator pedal, requesting an increase in vehicle acceleration. However, as discussed above, clutch torque capacity for an on-coming clutch during an upshift may be scheduled as a function of the transmission input torque request at the start of the shift. Thus, if the transmission input torque rises too quickly during an upshift, the clutch may not be able to increase torque capacity quickly enough, the transmission assembly input speed may start to accelerate, and the shift may not finish, or conclude, as transmission assembly input speed may have to decrease for an upshift event. Accordingly, between time t2 and t3, electric machine torque is increased, indicated via plot 835, to enable wheel torque demand to be met, without increasing transmission assembly input torque.

Furthermore, between time t2 and t3, engine torque is increased, indicated by plot 845, in line with requested, or desired transmission input torque, indicated by plot 840. However, to maintain transmission input torque constant, the vehicle controller commands the ISG (e.g. 142) to provide a negative torque, indicated via plot 855. It may be understood that an amount of negative torque provided via the ISG may offset the amount whereby engine torque is increased, while maintaining transmission assembly input torque constant, indicated by plot 850.

Between time t3 and t4, electric machine torque reaches a plateau, at an amount of electric machine torque enabling requested wheel torque, indicated by plot 825, to be substantially equivalent to actual wheel torque, indicated by plot 830. Furthermore, negative torque provided via the ISG reaches a plateau, at an amount of negative ISG torque enabling engine torque, indicated by plot 845, to be substantially equivalent to requested, or desired transmission assembly input torque, indicated by plot 840. However, because engine torque is offset by the negative ISG torque, transmission assembly input torque remains constant.

Still further, in example timeline 800, between plots t3 and t4, it may be understood that on-coming clutch capacity increases according to an amount originally planned for the upshift event. As discussed above with regard to method 600, in some examples, clutch capacity may be increased above what was originally planned for the shift. In such an example, transmission assembly input torque may not be maintained constant, but may be coordinated with such an increase in clutch capacity. However, in this example timeline 800, transmission assembly input torque is indicated to be maintained constant between time t3 and t4, as on-coming clutch capacity is increased according to an amount originally planned for the shift.

At time t4, capacity on the off-going clutch reduces to a point where it may be understood that the off-going clutch is open at time t4. Furthermore, at time t4, engine speed, indicated by plot 815, may be commanded to be reduced to synchronize with a speed of the second input shaft, such that the shift event may be concluded. Reduction in transmission input speed may be accomplished via making more negative the ISG torque, to put additional load on the engine to reduce its speed. In timeline 800, reduction in engine speed is indicated to be accomplished via the ISG providing a more negative torque between time t4 and t5, thus resulting in a reduction in engine speed between time t4 and t5. Furthermore, between time t4 and t5, clutch capacity is increased on the on-coming clutch, to enable the on-coming clutch to carry all of the torque provided to the transmission.

Between time t5 and t6, on-coming clutch torque capacity is rapidly increased, indicated by plot 860. More specifically, it may be understood that clutch torque capacity is rapidly increased between time t5 and t6 to an amount greater than requested, or desired transmission assembly input torque, indicated by plot 840. With clutch torque on the on-coming clutch increased to an amount greater than requested transmission assembly input torque, electric machine torque is decreased between time t5 and t6. Furthermore, negative ISG torque is made less negative, and reduced until no torque (positive or negative) is being supplied via the ISG. With engine torque, indicated by plot 845, being substantially equivalent to requested input torque, indicated by plot 840, as negative ISG torque is reduced, actual transmission input torque, indicated by plot 850 may accordingly increase. Thus, by time t6, negative torque contribution from the ISG is reduced to supplying no torque, and accordingly, transmission assembly input torque is substantially equivalent to requested, or desired, transmission input torque. In other words, by eliminating the load on the engine provided via the ISG, transmission input torque may thus be equivalent to engine torque.

Between time t6 and t7, requested wheel torque, indicated by plot 825 is substantially equivalent to actual wheel torque, with the wheel torque being provided via engine torque. More specifically, the engine is operating at a level of torque whereby the transmission assembly input speed is substantially equivalent to requested transmission assembly input speed.

In this way, by utilizing an electric machine (e.g. 120), or one or more electric motor(s) (e.g. 133*a*, 133*b*) positioned downstream of a dual clutch transmission, vehicle acceleration requests may be met without substantial delay under conditions where the transmission is in a torque tracking mode of operation, under conditions where the acceleration request occurs during an upshift event, and/or under conditions where a clutch torque capacity estimate is not correct.

The technical effect is to recognize that by positioning an electric machine, or electric motors downstream of the dual clutch transmission, wheel torque demands may be met under conditions where a clutch torque capacity would otherwise limit a rate what which a wheel torque request may be met. A further technical effect is to recognize that, while a wheel torque request is being met via an electric machine, or electric motor(s) downstream of the transmission, engine torque may be increased to a desired transmission input torque, while offsetting the engine torque via providing negative torque via an integrated starter/generator coupled to the engine. In this way, responsive to clutch torque capacity being increased above the desired transmission input torque while the wheel torque demand is being met at least in part via the electric machine or electric motor(s), by making ISG torque less negative, transmission input torque may be rapidly increased to meet wheel torque demand.

The systems described herein, and with reference to FIGS. 1A-3, along with the methods described herein, and with reference to FIG. 6, may enable one or more systems and one or more methods. In one example, a method comprises transferring transmission input torque through a clutch of a dual clutch transmission controlled to a first capacity less than a maximum capacity; and in response to a desired transmission input torque exceeding the capacity, increasing torque output of a motor coupled downstream of the dual clutch transmission to assist in meeting a wheel torque demand, while maintaining transmission input torque below the first capacity. In a first example of the method, the method further comprises increasing the clutch capacity from the first capacity to a second capacity greater than the desired transmission input torque while the torque output of the motor is assisting in meeting wheel torque demand. A second example of the method optionally includes the first example, and further comprises increasing transmission input torque while increasing the clutch capacity to the second capacity, while maintaining the transmission input torque below the increasing clutch capacity. A third example of the method optionally includes any one or more or each of the first and second examples, and further comprises reducing torque output of the motor while increasing transmission input torque, to meet the wheel torque demand. A fourth example of the method optionally includes any one or more or each of the first through third examples, and further comprises increasing engine torque to the desired input torque while offsetting the increased engine torque via negative torque provided via an integrated starter/generator coupled to the engine, where increasing the transmission input torque while increasing the clutch capacity is accomplished via reducing the negative torque provided via the integrated starter/generator. A fifth example of the method optionally includes any one or more or each of the first through fourth examples, and further includes wherein the desired input torque exceeding the capacity is indicated as a function of a position of an accelerator pedal. A sixth example of the method optionally includes any one or more or each of the first through fifth examples, and further includes wherein the motor coupled downstream of the dual clutch transmission includes an electric machine configured to provide torque to driven wheels, where driven wheels include one or more wheels receiving power from the engine, or one or more electric motors coupled to non-driven wheels. A seventh example of the method optionally includes any one or more or each of the first through sixth examples, and further includes wherein increasing torque output of the motor in response to the desired input torque exceeding the capacity occurs during a gear upshift event of the dual clutch transmission.

Another example of a method for a vehicle comprises propelling a vehicle by at least an engine removably coupled to a dual clutch transmission, and during a transmission gear upshift event from a first, lower gear to a second, higher gear, increasing a torque capacity of an on-coming transmission clutch to a first clutch torque capacity scheduled at a start of the upshift event; reducing a clutch capacity on an off-going transmission clutch to a second clutch capacity; and in response to an indication of a vehicle acceleration request during the upshift event, determining a desired transmission assembly input torque based on the acceleration request, and under conditions wherein the first clutch torque capacity is lower than the desired transmission assembly input torque, assisting in meeting the acceleration request via increasing torque output from one or more electric motor(s) positioned downstream of the transmission configured to propel the vehicle. In a first example of the method, the method further includes wherein the one or more electric motor(s) include an electric machine configured to propel the vehicle via one or more driven wheels of the vehicle, or one or more electric motor(s) configured to propel the vehicle via one or more non-driven wheels of the vehicle, where driven wheels include wheels powered via the engine, and where non-driven wheels include wheels not powered via the engine. A second example of the method optionally includes the first example, and further comprises providing torque to the engine, or producing electrical power when the engine is in operation, via an integrated starter/generator; and in response to the indication of the acceleration request during the upshift event, where the first clutch torque capacity is lower than the desired transmission assembly input torque: increasing an engine torque amount to the desired transmission input torque, while maintaining an actual transmission input torque constant by providing a first negative torque via the integrated starter/generator to maintain actual transmission input torque below the first clutch torque capacity while the acceleration request is met at least in part via the one or more electric motor(s) configured to propel the vehicle. A third example of the method optionally includes any one or more or each of the first and second examples, and further comprises providing a second negative torque via the integrated starter/generator, more negative than the first negative torque, subsequent to providing the first negative torque via the integrated starter/generator, to modulate a transmission input speed in order to reduce the transmission input speed to a speed that enables the gear upshift from the first gear to the second gear. A fourth example of the method optionally includes any one or more or each of the first through third examples, and further comprises subsequent to shifting to the second, higher gear, increasing the capacity of the first input clutch to a third clutch torque capacity above the desired transmission assembly input torque; and reducing negative torque provided via the integrated starter/generator to increase actual transmission input torque to the desired transmission input torque. A fifth example of the method optionally includes any one or more or each of the first through fourth examples, and further comprises subsequent to shifting to the second, higher gear, and while actual transmission input torque is increasing, reducing torque output from the one or more electric motor(s) to meet the acceleration request. A sixth example of the method optionally includes any one or more or each of the first through fifth examples, and further includes wherein the indication of the vehicle acceleration request during the upshift event is indicated as a function of a position of an accelerator pedal. A seventh example of the method optionally includes any one or more or each of the first though sixth examples, and further includes wherein the second clutch capacity comprises an open off-going clutch.

An example of a system comprises an engine including a crankshaft; a dual clutch transmission coupled to the engine including a first clutch, a second clutch, a first input shaft, a second input shaft, and an output shaft; an integrated starter/generator coupled to the engine; an electric motor positioned downstream of the transmission; a first speed sensor configured to monitor speed of the crankshaft; a second speed sensor configured to monitor speed of the output shaft; one or more engine torque actuator(s); and a controller storing executable instructions in non-transitory memory that, when executed, cause the controller to: in response to a request for vehicle acceleration, indicate a desired transmission input torque based on a wheel torque demand, and indicate an expected capacity of a clutch of the dual clutch transmission responsible for transferring engine torque through the transmission; increase transmission input torque to the desired transmission input torque responsive to an indication that the expected capacity of the clutch responsible for transferring engine torque through the transmission is greater than the desired transmission input torque; indicate that the expected capacity of the clutch responsible for transferring engine torque through the transmission is incorrect responsive to an indication that a crankshaft speed, measured via the first speed sensor, is greater than an output shaft speed, indicated via the second speed sensor; and in response to the indication that the expected capacity of the clutch responsible for transferring engine torque through the transmission is incorrect, reduce the transmission input torque to below the desired input torque until it is indicated that crankshaft speed is equal to the output shaft speed, and increase a torque output of the electric motor downstream of the transmission to meet the wheel torque demand. In a first example of the system, the system further comprises additional instructions to update the expected clutch capacity with a new clutch capacity estimate in response to crankshaft speed equaling output shaft speed; and increase clutch capacity to a capacity greater than the desired input torque subsequent to updating the expected clutch capacity with the new clutch capacity estimate. A second example of the system optionally includes the first example, and further comprises additional instructions to increase transmission input torque to the desired input torque responsive to increasing the clutch capacity to the capacity greater than the desired input torque; and reduce the torque output of the electric motor while actual desired input torque is increasing to meet the wheel torque demand. A third example of the system optionally includes any one or more or each of the first and second examples, and further comprises additional instructions to reduce the transmission input torque to below the desired input torque until it is indicated that crankshaft speed is equal to the output shaft speed by providing a negative torque to the engine via the integrated starter/generator; and increase transmission input torque to the desired input torque via reducing, or making less negative, the negative torque to the engine via the integrated starter/generator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    transferring transmission input torque through a clutch of a dual clutch transmission controlled to a first capacity less than a maximum capacity; and
    during shifting from one clutch to the other, and further in response to an increase in driver pedal position while shifting from one clutch to the other:
        in response to a desired transmission input torque exceeding the maximum capacity, increasing torque output of a motor coupled downstream of the dual clutch transmission, including downstream of both clutches of the dual clutch transmission, to assist in meeting a wheel torque demand, while maintaining transmission input torque below the first capacity.

2. The method of claim 1, further comprising increasing a clutch capacity from the first capacity to a second capacity greater than the desired transmission input torque while the torque output of the motor is assisting in meeting wheel torque demand.

3. The method of claim 2, further comprising increasing transmission input torque while increasing the clutch capacity to the second capacity, while maintaining the transmission input torque below the increasing clutch capacity.

4. The method of claim 3, further comprising reducing torque output of the motor while increasing transmission input torque, to meet the wheel torque demand.

5. The method of claim 3, further comprising increasing engine torque to the desired transmission input torque while offsetting the increased engine torque via negative torque provided via an integrated starter/generator coupled to the engine, where increasing the transmission input torque while increasing the clutch capacity is accomplished via reducing the negative torque provided via the integrated starter/generator.

6. The method of claim 1, wherein the desired transmission input torque exceeding the maximum capacity is indicated as a function of a position of an accelerator pedal.

7. The method of claim 1, wherein the motor coupled downstream of the dual clutch transmission includes an electric machine configured to provide torque to driven wheels, where the driven wheels include one or more wheels receiving power from the engine or one or more electric motors coupled to non-driven wheels.

8. The method of claim 1, wherein increasing torque output of the motor in response to the desired transmission input torque exceeding the maximum capacity occurs during a gear upshift event of the dual clutch transmission.

9. A method for a vehicle, comprising:
propelling a vehicle by at least an engine removably coupled to a dual clutch transmission, and during a transmission gear upshift event from a first, lower gear to a second, higher gear, increasing a torque capacity of an on-coming transmission clutch to a first clutch torque capacity scheduled at a start of the upshift event;
reducing a clutch capacity on an off-going transmission clutch to a second clutch capacity; and
in response to an indication of a vehicle acceleration request during the upshift event, determining a desired transmission assembly input torque based on the acceleration request, and under conditions wherein the first clutch torque capacity is lower than the desired transmission assembly input torque, assisting in meeting the acceleration request via increasing torque output from one or more electric motor(s) positioned downstream of the transmission configured to propel the vehicle.

10. The method of claim 9, wherein the one or more electric motor(s) include an electric machine configured to propel the vehicle via one or more driven wheels of the vehicle or one or more electric motor(s) configured to propel the vehicle via one or more non-driven wheels of the vehicle, where the driven wheels include wheels powered via the engine and the non-driven wheels include wheels not powered via the engine.

11. The method of claim 9, further comprising providing torque to the engine, or producing electrical power when the engine is in operation, via an integrated starter/generator; and
in response to the indication of the acceleration request during the upshift event, where the first clutch torque capacity is lower than the desired transmission assembly input torque:
increasing an engine torque amount to the desired transmission assembly input torque, while maintaining an actual transmission input torque constant by providing a first negative torque via the integrated starter/generator to maintain the actual transmission input torque below the first clutch torque capacity while the acceleration request is met at least in part via the one or more electric motor(s) configured to propel the vehicle.

12. The method of claim 11, further comprising providing a second negative torque via the integrated starter/generator, more negative than the first negative torque, subsequent to providing the first negative torque via the integrated starter/generator, to modulate a transmission input speed in order to reduce the transmission input speed to a speed that enables the gear upshift from the first, lower gear to the second, higher gear.

13. The method of claim 11, further comprising subsequent to shifting to the second, higher gear, increasing a capacity of the first clutch to a third clutch torque capacity above the desired transmission assembly input torque; and
reducing negative torque provided via the integrated starter/generator to increase the actual transmission input torque to the desired transmission assembly input torque.

14. The method of claim 13, further comprising subsequent to shifting to the second, higher gear, and while the actual transmission input torque is increasing, reducing torque output from the one or more electric motor(s) to meet the acceleration request.

15. The method of claim 9, wherein the indication of the vehicle acceleration request during the upshift event is indicated as a function of a position of an accelerator pedal.

16. The method of claim 9, wherein the second clutch capacity comprises an open off-going clutch.

17. A system for a vehicle, comprising:
an engine including a crankshaft;
a dual clutch transmission coupled to the engine including a first clutch, a second clutch, a first input shaft, a second input shaft, and an output shaft;
an integrated starter/generator coupled to the engine;
an electric motor positioned downstream of the transmission;
a first speed sensor configured to monitor speed of the crankshaft;
a second speed sensor configured to monitor speed of the output shaft;
one or more engine torque actuator(s); and
a controller storing executable instructions in non-transitory memory that, when executed, cause the controller to:
in response to a request for vehicle acceleration, indicate a desired transmission input torque based on a wheel torque demand, and indicate an expected capacity of a clutch of the transmission responsible for transferring engine torque through the transmission;
increase transmission input torque to the desired transmission input torque responsive to an indication that the expected capacity of the clutch responsible for transferring engine torque through the transmission is greater than the desired transmission input torque;
indicate that the expected capacity of the clutch responsible for transferring engine torque through the transmission is incorrect responsive to an indication that a crankshaft speed, measured via the first speed sensor, is greater than an output shaft speed, indicated via the second speed sensor; and
in response to the indication that the expected capacity of the clutch responsible for transferring engine torque through the transmission is incorrect, reduce the transmission input torque to below the desired input torque until it is indicated that the crankshaft speed is equal to the output shaft speed, and increase a torque output of the electric motor downstream of the transmission to meet the wheel torque demand.

18. The system of claim 17, further comprising additional instructions to update the expected clutch capacity with a new clutch capacity estimate in response to the crankshaft speed equaling the output shaft speed; and increase a clutch capacity to a capacity greater than the desired transmission input torque subsequent to updating the expected clutch capacity with the new clutch capacity estimate.

19. The system of claim 18, further comprising additional instructions to increase transmission input torque to the desired transmission input torque responsive to increasing the clutch capacity to the capacity greater than the desired transmission input torque; and reduce the torque output of the electric motor while an actual transmission desired input torque is increasing to meet the wheel torque demand.

20. The system of claim 19, further comprising additional instructions to reduce the transmission input torque to below the desired transmission input torque until it is indicated that the crankshaft speed is equal to the output shaft speed by providing a negative torque to the engine via the integrated starter/generator; and increase transmission input torque to the desired transmission input torque via reducing, or making less negative, the negative torque provided to the engine via the integrated starter/generator.

* * * * *